US012086310B2

(12) United States Patent
Tamaki

(10) Patent No.: US 12,086,310 B2
(45) Date of Patent: Sep. 10, 2024

(54) ELECTRONIC APPARATUS AND CONTROL METHOD

(71) Applicant: CANON KABUSHIKI KAISHA, Tokyo (JP)

(72) Inventor: Yoshihito Tamaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 17/929,540

(22) Filed: Sep. 2, 2022

(65) Prior Publication Data
US 2023/0076475 A1 Mar. 9, 2023

(30) Foreign Application Priority Data
Sep. 6, 2021 (JP) .................. 2021-144927

(51) Int. Cl.
G06F 3/01 (2006.01)
G06F 3/0482 (2013.01)
G06T 3/40 (2024.01)
G06T 7/73 (2017.01)
G06T 11/00 (2006.01)

(52) U.S. Cl.
CPC ............ G06F 3/013 (2013.01); G06F 3/0482 (2013.01); G06T 3/40 (2013.01); G06T 7/73 (2017.01); G06T 11/00 (2013.01); G06F 2203/04806 (2013.01)

(58) Field of Classification Search
None
See application file for complete search history.

(56) References Cited

U.S. PATENT DOCUMENTS

| 5,913,079 A | * | 6/1999 | Aoyama | G02B 7/28 396/234 |
| 10,510,137 B1 | * | 12/2019 | Kitain | F41G 3/2611 |
| 2014/0085189 A1 | * | 3/2014 | Shimasaki | G06F 3/013 345/156 |
| 2015/0022682 A1 | * | 1/2015 | Seita | H04N 23/672 348/220.1 |
| 2015/0082145 A1 | * | 3/2015 | Ames | G06F 3/012 715/234 |
| 2015/0105123 A1 | * | 4/2015 | Song | H04N 23/45 455/556.1 |
| 2016/0139665 A1 | * | 5/2016 | Lopez | G06F 3/013 345/156 |

(Continued)

FOREIGN PATENT DOCUMENTS

JP 2020119093 A 8/2020

Primary Examiner — Nurun Flora
(74) Attorney, Agent, or Firm — Canon U.S.A., Inc. IP Division

(57) ABSTRACT

An electronic apparatus includes at least one processor configured to perform the operations of the following units: a display unit configured to display a captured image, an acquisition unit configured to acquire line-of-sight information including a line-of-sight position of an observer that observes the display unit, a display control unit configured to control display based on the line-of-sight information, and a selection unit configured to select an object based on the line-of-sight information. The display unit highlights a limited area as a part of the captured image based on the line-of-sight information. The selection unit selects an object based on the observer's line-of-sight information about the display.

10 Claims, 18 Drawing Sheets

(56) References Cited

U.S. PATENT DOCUMENTS

| | | | | |
|---|---|---|---|---|
| 2017/0351327 A1* | 12/2017 | Yasuda | .................. | G06F 3/013 |
| 2021/0051265 A1* | 2/2021 | Kimura | ................. | G06V 20/52 |
| 2021/0223860 A1* | 7/2021 | Fujiwara | ................ | G06F 3/013 |

* cited by examiner

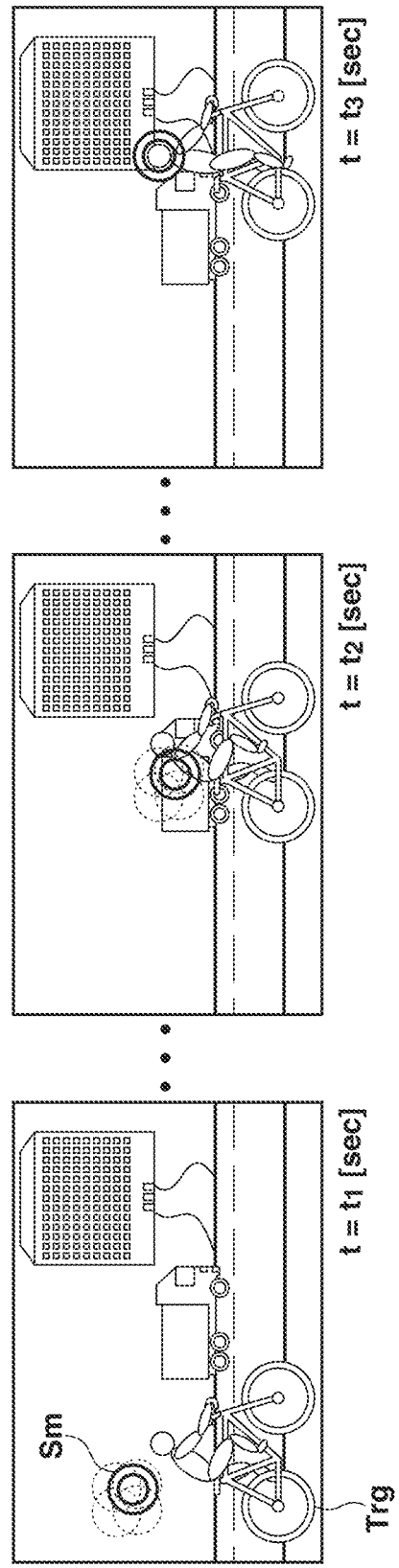

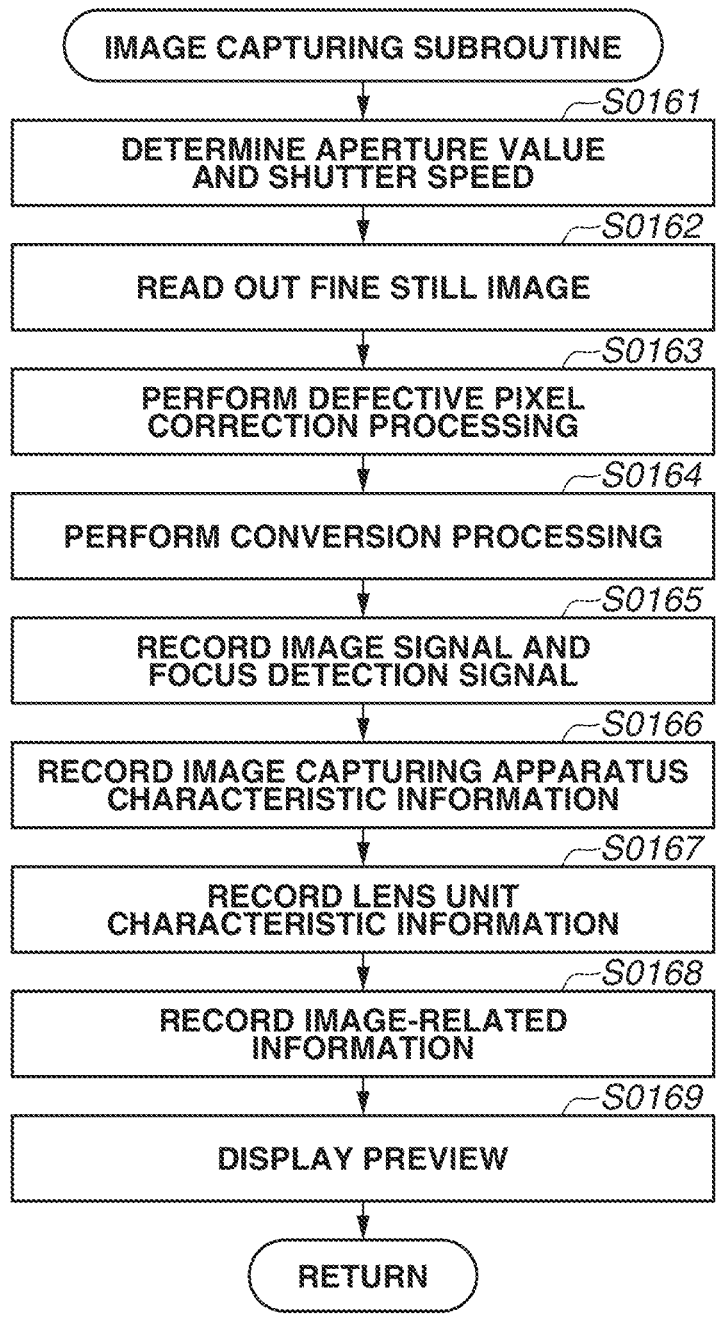

ELECTRONIC APPARATUS AND CONTROL METHOD

BACKGROUND

Field of the Disclosure

The present disclosure relates to an electronic apparatus capable of detecting the line of sight of an observer that observes a display unit.

Description of the Related Art

There are known techniques for detecting a user's line-of-sight position.

Japanese Patent Application Laid-Open No. 2020-119093 discusses a technique for detecting the line-of-sight position of a user that looks at a display unit, and causing the display unit to display a mark indicating the detected line-of-sight position of the user, to assist the user to select an item displayed on the display unit.

SUMMARY

According to an aspect of the present disclosure, an electronic apparatus includes at least one processor or circuit configured to perform the operations of the following units: a display unit configured to display a captured image, an acquisition unit configured to acquire line-of-sight information including a line-of-sight position of an observer that observes the display unit, a display control unit configured to control display based on the line-of-sight information, and a selection unit configured to select an object based on the line-of-sight information. The display unit highlights a limited area as a part of the captured image based on the line-of-sight information. The selection unit selects an object based on the observer's line-of-sight information about the display.

Further features of the present disclosure will become apparent from the following description of exemplary embodiments with reference to the attached drawings.

BRIEF DESCRIPTION OF THE DRAWINGS

FIGS. 10A to 10C each illustrate stop determination in the line-of-sight state determination processing according to one or more aspects of the present disclosure.

FIG. 17 is a flowchart illustrating an image capturing subroutine according to one or more aspects of the present disclosure.

DESCRIPTION OF THE EMBODIMENTS

In the technique discussed in Japanese Patent Application Laid-Open No. 2020-119093 described above, the user cannot select an object intended by the user in some cases depending on, for example, the layout of the object to be selected or the detection accuracy of the line-of-sight position.

The present disclosure is directed to providing an electronic apparatus with an improved user-friendliness to select an object based on a line-of-sight position, and a control method for the electronic apparatus.

A first exemplary embodiment of the present disclosure will be described in detail below with reference to the accompanying drawings.

[Description of Configuration of Electronic Apparatus]

Figure 1:
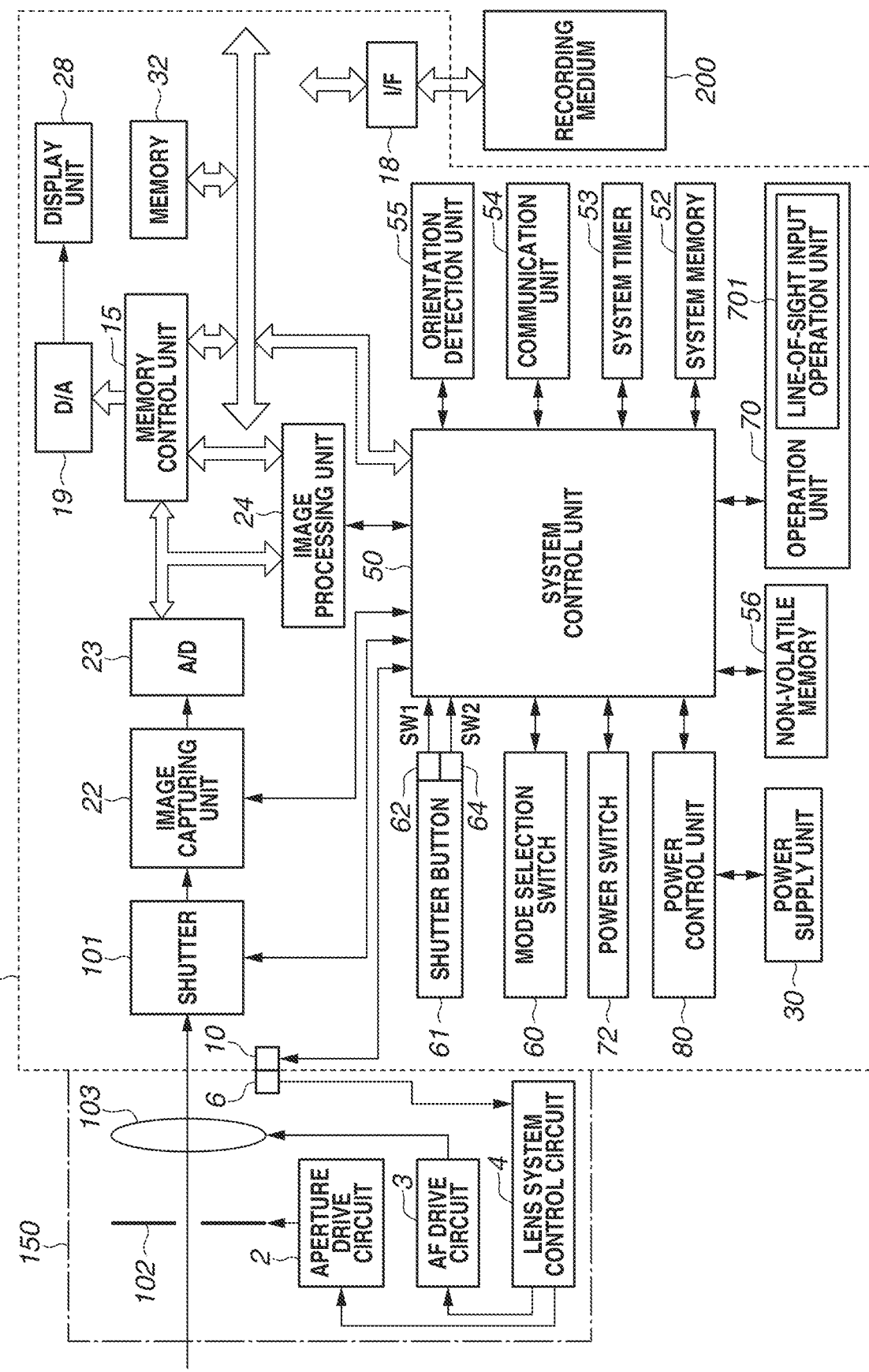
FIG. 1 is a block diagram illustrating the configuration of an image capturing apparatus including an electronic apparatus.

FIG. 1 is a block diagram illustrating the configuration of an image capturing apparatus. An apparatus including the image capturing apparatus is also referred to as an electronic apparatus. A lens unit 150 illustrated in FIG. 1 is a lens unit incorporating an interchangeable image capturing lens. The lens 103 is generally composed of a plurality of lenses. In this case, however, a single lens is illustrated for simplicity. A communication terminal 6 is a communication terminal for the lens unit 150 to communicate with a digital camera 100. A communication terminal 10 is a communication terminal for the digital camera 100 to communicate with the lens unit 150. The lens unit 150 communicates with a system control unit 50 via the communication terminals 6 and 10. A lens system control circuit 4 provided in the lens unit 150 controls an aperture 102 via an aperture drive circuit 2, and shifts the position of the lens 103 via an autofocus (AF) drive circuit 3 to thereby perform focusing.

A shutter 101 is a focal plane shutter capable of freely controlling the exposure time of an image capturing unit 22 under the control of the system control unit 50. The image capturing unit 22 is an imaging device that converts an optical image into an electric signal and is composed of a charge-coupled device (CCD) sensor, a complementary metal-oxide semiconductor (CMOS) sensor, or another type of sensor. An analog-to digital (A/D) converter 23 converts an analog signal into a digital signal. The A/D converter 23 is used to convert analog signals output from the image capturing unit 22 into digital signals. The signals obtained from the image capturing unit 22 are used in exposure control and focus detection control, as well as in image capturing. In the image capturing unit 22, a pixel in which a photoelectric conversion unit is divided is provided for a single microlens. The divided photoelectric conversion units result in dividing an entrance pupil, which makes it possible to obtain a phase detection signal from each photoelectric conversion unit. Adding signals from the divided photoelectric conversion units produces an image capturing signal.

Such a pixel is advantageous in that a pixel can be used as both a focus detection pixel and an image capturing pixel.

An image processing unit 24 performs a predetermined pixel interpolation, resizing processing, such as reduction, and color conversion processing on data from the A/D converter 23 or data from a memory control unit 15. The image processing unit 24 also performs predetermined arithmetic processing using captured image data, and the system control unit 50 performs exposure control and ranging control based on the obtained arithmetic processing result. Thus, through-the-lens (TTL) AF processing, auto exposure (AE) processing, and flash preliminary emission (EF) processing are performed. The image processing unit 24 further performs predetermined arithmetic processing using captured image data, and also performs TTL auto white balance (AWB) processing based on the obtained arithmetic processing result.

Output data from the A/D converter 23 is written into a memory 32 via the image processing unit 24 and the memory control unit 15, or is directly written into the memory 32 via the memory control unit 15. The memory 32 stores image data that is obtained by the image capturing unit 22 and is converted into digital data by the A/D converter 23, and image data to be displayed on a display unit 28 serving as a display unit according to an exemplary embodiment of the present disclosure.

The memory 32 has a sufficient capacity to store a predetermined number of still images and a predetermined time of a moving image and sound data.

The memory 32 is also used as a memory (video memory) for image display. A digital-to-analog (D/A) converter 19 converts data for image display stored in the memory 32 into an analog signal and supplies the analog signal to the display unit 28. Thus, the image data for display written into the memory 32 is displayed by the display unit 28 through the D/A converter 19. The display unit 28 performs display on a display, such as a liquid crystal device (LCD), based on the analog signal supplied from the D/A converter 19. Digital signals that are subjected to the A/D conversion once by the A/D converter 23 and stored in the memory 32 are converted into analog signals by the D/A converter 19 and are sequentially transferred to the display unit 28, and the transferred analog signals are displayed on the display unit 28, allowing an electronic viewfinder (EVF) function to be carried out and live image display (live view display) to be performed. The display unit 28 may be provided with an EVF through which a user views an object through an eyepiece (not illustrated), or may be provided with a display formed on the back surface of the digital camera 100. The display unit 28 may be provided with both the electronic viewfinder and the display formed on the back surface of the digital camera 100.

A non-volatile memory 56 is an electrically erasable and recordable memory. For example, an electrically erasable programmable read-only memory (EEPROM) is used as the non-volatile memory 56. The non-volatile memory 56 stores constants and programs for operation of the system control unit 50. The programs used herein refer to programs for performing processing in various flowcharts to be described below according to the present exemplary embodiment.

The system control unit 50 generally controls the digital camera 100. The system control unit 50 includes a line-of-sight display unit, a line-of-sight state determination unit, a line-of-sight information determination unit, an object detection unit, and a line-of-sight acquisition determination unit according to the present exemplary embodiment. The programs recorded on the non-volatile memory 56 described above are run to thereby perform each piece of processing according to the present exemplary embodiment as described below. A random access memory (RAM) is used as a system memory 52. Constants and variables for operation of the system control unit 50, and programs read out from the non-volatile memory 56 are loaded into the system memory 52. The system control unit 50 also performs display control by controlling the memory 32, the D/A converter 19, the display unit 28, and other units. Examples of the display unit 28 include an EVF through which a user can observe an object, and a thin-film transistor (TFT) liquid crystal display on which the user can perform touch operations and other operations without looking into the display. In the display unit 28, an eye sensor installed on the EVF performs display control for controlling the display unit 28 based on information indicating whether the user' eye is in contact with the eyepiece or is separated from the eyepiece.

A system timer 53 is a time measurement unit that measures times for use in various control operations and the time of a built-in clock.

A power switch 72 is an operation member for turning on and off the power of the digital camera 100.

A mode selection switch 60, a first shutter switch 62, a second shutter switch 64, and an operation unit 70 are operation units for inputting various operation instructions to the system control unit 50.

The operation unit 70 includes a line-of-sight acquisition unit and a line-of-sight determination unit according to the present exemplary embodiment.

The mode selection switch 60 switches an operation mode of the system control unit 50 to a still image recording mode, a moving image capturing mode, a playback mode, or another mode. Examples of the still image recording mode include an auto image capturing mode, an auto scene determination mode, a manual mode, an aperture prioritized mode (Av mode), and a shutter speed prioritized mode (Tv mode). Examples of the still image recording mode also include various types of scene modes in which image capturing settings are made for different image capturing scenes, a program AE mode, and a custom mode. The mode selection switch 60 can be used to switch directly to one of these modes included in a menu screen. Alternatively, the mode switch may be carried out by first switching a screen to the menu screen using the mode selection switch 60 and then using another operation member to switch to one of the modes included in the menu screen. Similarly, the moving image capturing mode may include a plurality of modes.

The first shutter switch 62 turns on halfway through the operation of a shutter button 61 provided in the digital camera 100, or in other words, when the button is depressed halfway (image capturing preparation instruction), generating a first shutter switch signal SW1. Operations such as AF processing, AE processing, AWB processing, and EF processing are started by the first shutter switch signal SW1.

The second shutter switch 64 turns on when the shutter button 61 is completely operated, or in other words, when the shutter button 61 is fully depressed (image capturing instruction), generating a second shutter switch signal SW2. The system control unit 50 starts a series of image capturing processing operations from reading out signals from the image capturing unit 22 to writing image data into a recording medium 200 in response to the second shutter switch signal SW2.

Functions are appropriately allocated to the respective operation members of the operation unit 70 depending on scenes by, for example, an operation to select various function icons displayed on the display unit 28, so that the operation members of the operation unit 70 operate as various function buttons. Examples of the function buttons include an end button, a back button, a next image button, a jump button, a sort button, and an attribute change button. For example, a menu screen on which various types of settings can be made is displayed on the display unit 28 when a menu button is pressed. The user can make various types of settings intuitively using the menu screen displayed on the display unit 28, four directional buttons, i.e., up, down, left, and right buttons, and a set button.

The operation unit 70 includes various operation members each functioning as an input unit that receives operations from the user.

The operation unit 70 is provided with electronic buttons, a directional key, and the like for, for example, menu selection, mode selection, and playback of a captured moving image.

A power control unit 80 includes a battery detection circuit, a direct-current (DC)-DC converter, and a switch circuit for switching blocks to be energized. The power control unit 80 detects whether a battery is connected, the type of the battery, and a remaining battery level. The power control unit 80 also controls the DC-DC converter based on the detection results and instructions from the system control unit 50, and supplies a voltage for a period to various units including the recording medium 200.

A power supply unit 30 is composed of a primary battery such as an alkali battery or a lithium battery, a secondary battery such as a NiCd battery, a NiMH battery, or a Li battery, an alternating current (AC) adapter, or other components. A recording medium interface (I/F) 18 is an interface for the recording medium 200 such as a memory card or a hard disk. The recording medium 200 is a recording medium, such as a memory card, for recording captured images, and is a semiconductor memory, a magnetic disk, or the like.

A communication unit 54 is connected wirelessly or connected with a wired cable, and transmits and receives video signals and audio signals. The communication unit 54 can also be connected to a wireless local area network (LAN) and the Internet. The communication unit 54 can also transmit images (including a live image) captured by the image capturing unit 22 and images recorded on the recording medium 200, and can also receive image data and various other types of information from external apparatuses.

An orientation detection unit 55 detects the orientation of the digital camera 100 with respect to the gravity direction. Whether an image captured by the image capturing unit 22 is an image captured with the digital camera 100 held horizontally or vertically can be determined based on the orientation detected by the orientation detection unit 55. The system control unit 50 can add direction information based on the orientation detected by the orientation detection unit 55 to the image file of an image captured by the image capturing unit 22 and can rotate the image to record the rotated image. An acceleration sensor, a gyroscope sensor, or other types of sensor can be used as the orientation detection unit 55.

[Description of Configuration for Line-of-Sight Detection]

Figure 4:
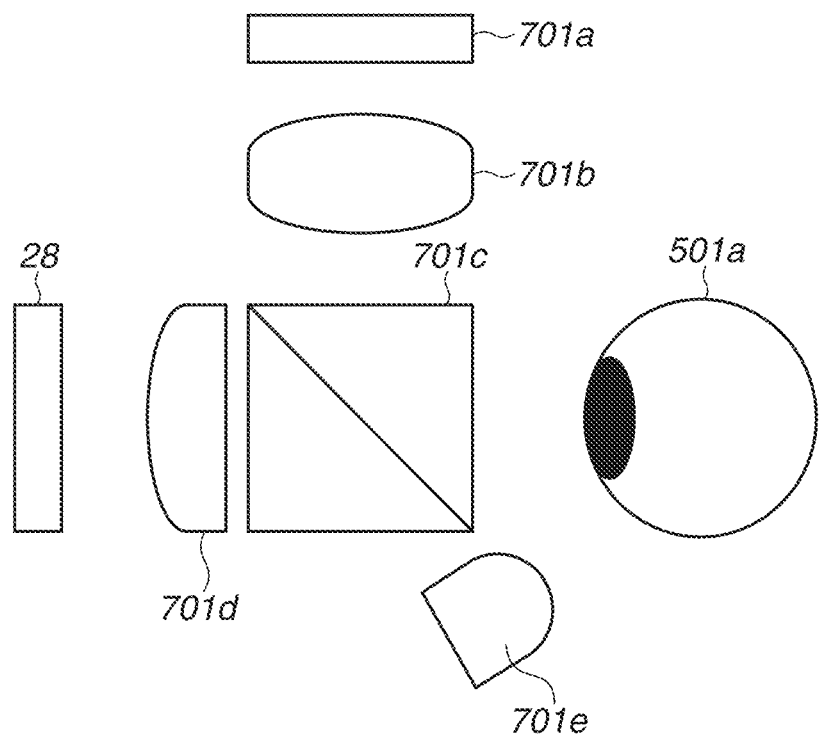
FIG. 4 illustrates a configuration example of a line-of-sight input operation unit.

In the present exemplary embodiment, a line-of-sight input operation unit 701 is provided as one example of the operation unit 70. The line-of-sight input operation unit 701 functions as the line-of-sight acquisition unit according to the present exemplary embodiment, and is an operation member for detecting the area of the display unit 28 indicated by the user's line of sight. FIG. 4 illustrates an example of the line-of-sight input operation unit 701. FIG. 4 illustrates a configuration of a system for detecting the rotational angle of the optical axis of an eyeball 501a of the user viewing the field of view of a finder discussed in Japanese Patent Application Laid-Open No. 2020-119093, and for detecting the user's line of sight based on the detected rotational angle. The display unit 28 displays a live view display image captured through the lens unit 150. This configuration includes an image sensor 701a, a light-receiving lens 701b, a dichroic mirror 701c, an eyepiece lens 701d, and an illumination light source 701e. The illumination light source 701e projects infrared light onto the eyeball 501a. The infrared light reflecting on the eyeball 501a further reflects on the dichroic mirror 701c and is captured by the image sensor 701a. The captured eyeball image is converted into a digital signal by an A/D converter (not illustrated) and the digital signal is transmitted to the system control unit 50. The system control unit 50 serving as the line-of-sight acquisition unit extracts the pupil area and other information from the captured eyeball image, and calculates the user's line of sight.

Figure 5:
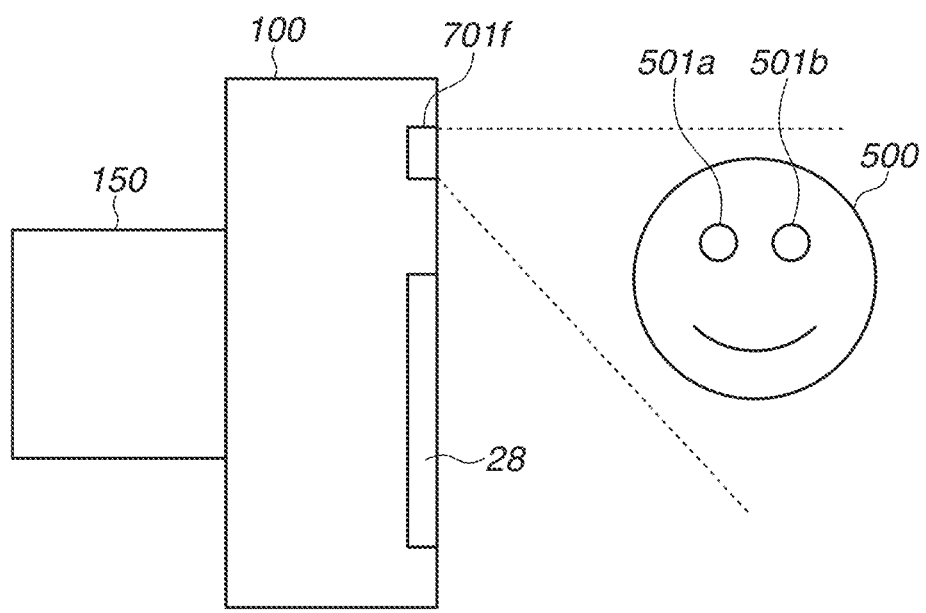
FIG. 5 illustrates another configuration example of the line-of-sight input operation unit.

The line-of-sight input operation unit 701 is not limited to this system, but instead may be a system for detecting the user's line of sight by capturing images of the both eyes of the user. FIG. 5 illustrates another example of the line-of-sight input operation unit 701 that is different from the example illustrated in FIG. 4.

FIG. 5 illustrates a configuration in which a live view display image captured through the lens unit 150 is displayed on the display unit 28 provided on the back surface of the digital camera 100. In the configuration illustrated in FIG. 5, a camera 701f that is used to capture an image of a face 500 of the user that is observing the display unit 28 is provided on the back surface of the digital camera 100. An image capturing angle of view of the camera 701f is indicated by dashed lines in FIG. 5. Light is projected onto the face 500 of the user from the illumination light source 701e (not illustrated) to acquire an eyeball image by the camera 701f. Thus, the user's line of sight is calculated. The line-of-sight input operation unit 701 is not limited to this system, but instead may have any configuration as long as the line-of-sight input operation unit 701 can detect the area of the display unit 28 at which the user is gazing at.

[Line-of-Sight Position Selection Method]

A line-of-sight selection method according to a first exemplary embodiment will be described below with reference to FIGS. 6 to 15C.

Figure 6:
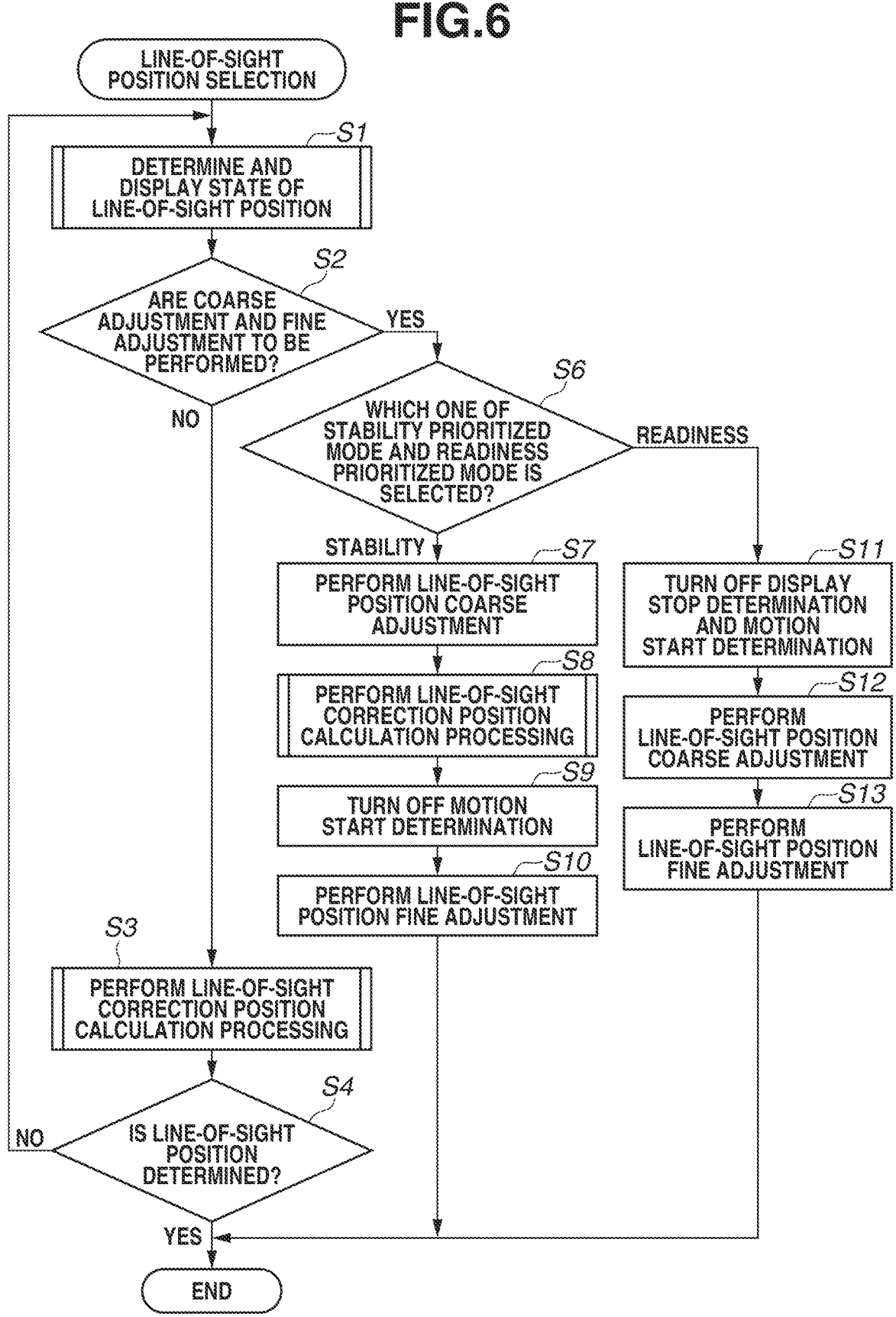
FIG. 6 is a flowchart illustrating a line-of-sight position selection method.

FIG. 6 is a main flowchart illustrating a line-of-sight selection method for an electronic apparatus according to the first exemplary embodiment. FIG. 6 is a flowchart illustrating an operation performed when the user performs a line-of-sight determination operation while viewing the image displayed on the display unit 28, and the operation is mainly performed by the system control unit 50. In the present exemplary embodiment, this operation will be described with reference to the block diagram of the image capturing apparatus illustrated in FIG. 1. This operation can also be performed in an electronic apparatus including at least the system control unit 50, the display unit 28, or the operation unit 70.

In step S1, the system control unit 50 determines the state of the line-of-sight position as light-of-sight detection information used to select the line-of-sight position. The line-of-sight detection and the line-of-sight position state determination and display will be described below with reference to FIGS. 8 to 13C.

In step S2, the system control unit 50 determines whether the user has selected to perform two steps of line-of-sight position selection processing, i.e., a line-of-sight coarse adjustment operation and a line-of-sight fine adjustment operation. If the user selects to perform two steps of line-of-sight position selection processing (YES in step S2), the processing proceeds to step S6 so that the line-of-sight position selection including the line-of-sight coarse adjustment operation and the line-of-sight fine adjustment operation can be carried out. If the user selects not to perform the two steps of line-of-sight position selection processing (NO in step S2), the processing proceeds to step S3 as the two steps of line-of-sight position selection processing are not carried out.

In step S3, the system control unit 50 corrects the line-of-sight position based on the result of state determination and display processing in step S1. A method for calculating the line-of-sight correction position in the line-of-sight position correction processing will be described with reference to FIG. 14 and FIGS. 15A to 15C.

In step S4, system control unit 50 determines whether to determine the line-of-sight position based on the line-of-sight correction position calculated in step S3. If the user selects to determine the line-of-sight position (YES in step S4), the line-of-sight position is determined, and then the processing in the main flowchart is terminated. If the user selects not to determine the line-of-sight position (NO in step S4), the processing returns to the line-of-sight position state determination in step S2 again, and steps S2 to S4 are repeated.

Next, a case where the user selects to perform two steps of line-of-sight position selection processing in step S1 will be described. In this case, the line-of-sight position selection processing including the line-of-sight coarse adjustment operation and the line-of-sight fine adjustment operation is carried out, so that the processing proceeds to step S6.

In step S6, the system control unit 50 further selects an operation mode for the line-of-sight position selection method according to the present exemplary embodiment. There are two types of operation modes to be selected. One of the operation modes is a stability prioritized mode to be used, for example, when the stability has priority over the readiness of the line-of-sight position calculation. The other of the operation modes is a readiness prioritized mode to be used, for example, when the readiness has priority over the stability of the line-of-sight position calculation.

If the user selects the stability prioritized mode in step S6 ("STABILITY" in step S6), the processing proceeds to step S7. If the user selects the readiness prioritized mode ("READINESS" in step S6), the processing proceeds to step S11. Next, these operation modes will be described.

In step S7, the system control unit 50 selects a first limited area within an image capturing screen to coarsely determine the line-of-sight position (coarse adjustment). Step S7 is processing to be performed after the user determines that the stability of the line-of-sight position is prioritized in step S6, and user's line-of-sight position coordinates smoothing processing is performed by the system control unit 50. The size of the first limited area is changed depending on a smoothing score obtained in the smoothing processing.

The user may change the smoothing score in the smoothing processing by setting a sensitivity for the line-of-sight position. In this case, the smoothing score obtained with a high sensitivity set is lower than the smoothing score obtained with a low sensitivity set.

The first limited area may be reduced to a size smaller than the normal size depending on the result of the user's line-of-sight position stop determination in step S1. A method for selecting the first limited area will be described below. After the completion of the line-of-sight position coarse adjustment, line-of-sight position start determination is performed the second determination number of times or the fifth determination number of times larger than the second determination number of times. After the first limited area is selected, the processing proceeds to step S8.

In step S8, the system control unit 50 causes a line-of-sight correction position calculation unit to correct the line-of-sight position according to the present exemplary embodiment in the same manner as in the above-described step S3 based on the result of the state determination and display processing in step S1. After the completion of the line-of-sight position correction processing, the processing proceeds to step S9.

In step S9, the system control unit 50 turns off the motion start determination performed in step S1 prior to the line-of-sight position fine adjustment in step S10. This is because the readiness can be prioritized in the line-of-sight position coarse adjustment. After the motion start determination is turned off, the processing proceeds to step S10. The motion start determination may remain in the on-state. This makes it possible to perform line-of-sight position selection processing more accurately.

In step S10, the system control unit 50 finely determines the line-of-sight position from the first limited area selected in step S7 (fine adjustment). In this case, the user's line-of-sight position stop determination is performed. In step S10, the stability prioritized mode that prioritizes the stability of the line-of-sight position is selected by the user in step S6. In this case, the line-of-sight position determination is performed the second determination number of times according to the present exemplary embodiment, or the third determination number of times larger than the second determination number of times, thereby stopping the display of the line-of-sight position. The position determined in the line-of-sight position fine adjustment is determined to be the line-of-sight position selected by the user, and then the processing in the main flowchart is terminated.

On the other hand, if the user selects the readiness prioritized mode in step S6, the processing proceeds to step S11.

In step S11, the system control unit 50 turns off the setting of the line-of-sight position display stop determination and the motion start determination performed in step S1 to prioritize the readiness of line-of-sight position information. Turning off these settings reduces a display retention period associated with the line-of-sight position display stop determination and the motion start determination.

In step S12, the system control unit 50 performs the line-of-sight position coarse adjustment in the same manner as in the above-described step S7.

After the completion of the line-of-sight position coarse adjustment, the line-of-sight position motion start determination is performed the second determination number of times according to the present exemplary embodiment, or the sixth determination number of times larger than the second determination number of times. After the line-of-sight position coarse adjustment is performed in step S12, the processing proceeds to step S13.

In step S13, the system control unit 50 performs the line-of-sight position fine adjustment as a second line-of-sight selection method according to the present exemplary embodiment in the same manner as in the above-described step S10. In this line-of-sight position stop determination, the display of the line-of-sight position is stopped by performing the line-of-sight determination the second determination number of times according to the present exemplary embodiment or the fourth determination number of times larger than the second determination number of times. The position determined in the line-of-sight position fine adjustment is determined to be the line-of-sight position selected by the user, and then the processing in the main flowchart is terminated.

[Descriptions of Line-of-Sight Detection and State Determination and Display]

Figure 8:
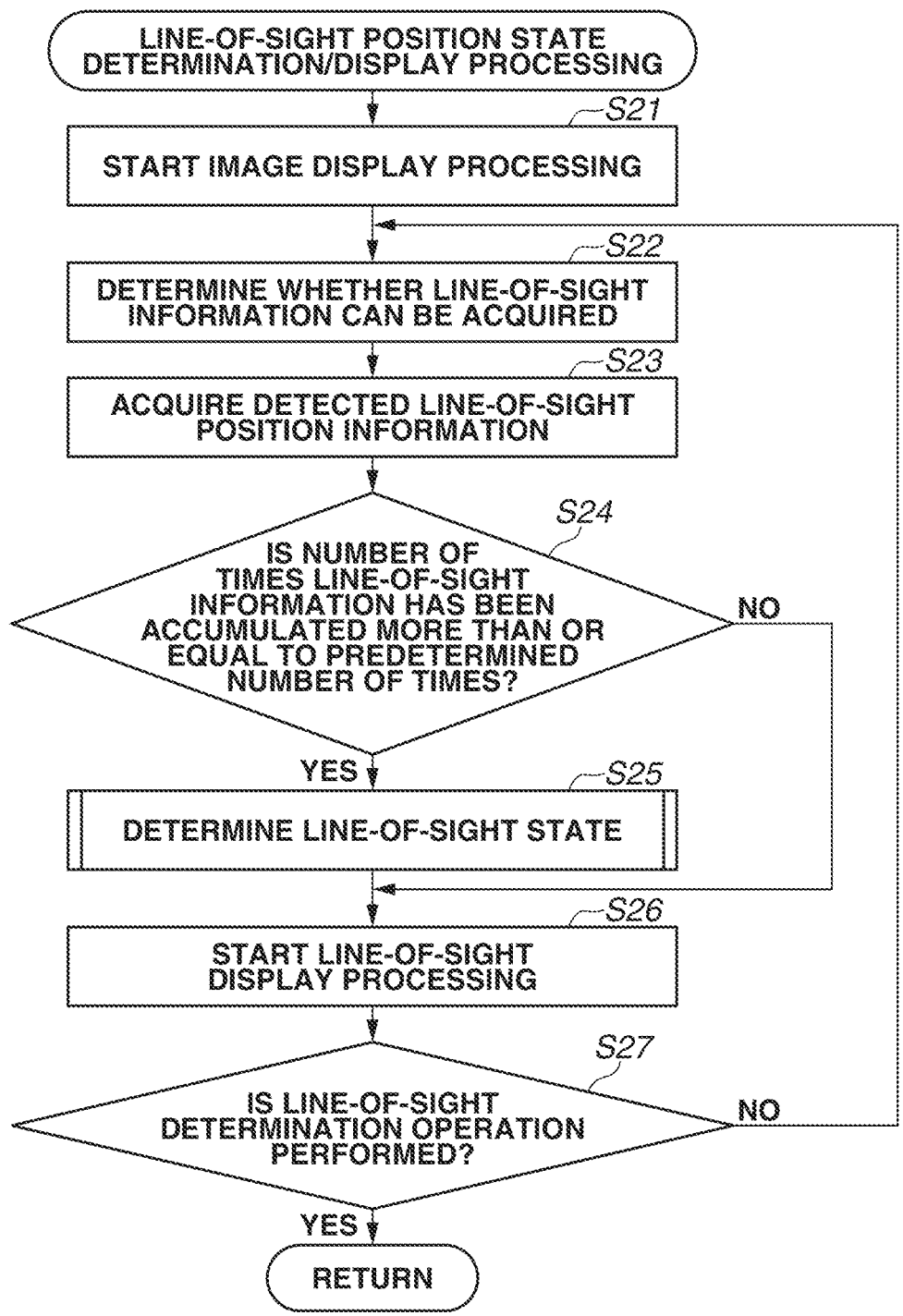
FIG. 8 is a main flowchart illustrating a line-of-sight detection processing method for an electronic apparatus according to one or more aspects of the present disclosure, line-of-sight position state determination, and determination results.

FIG. 8 is a sub-flowchart illustrating step S1 of the line-of-sight position state determination method and display processing performed when the user performs the line-of-sight determination operation while viewing the image displayed on the display unit 28. The processing of FIG. 8 is mainly implemented by the system control unit 50. The present exemplary embodiment is described with reference to the block diagram of the image capturing apparatus illustrated in FIG. 1. This operation can also be performed in an electronic apparatus including at least the system control unit 50, the display unit 28, or the operation unit 70.

In step S21, the system control unit 50 displays image data on the display unit 28. An image for display is, for example, an image in a size reduced depending on the resolution of the display unit 28. During the image display, the image is displayed at a predetermined frame rate. The user can check the display image through the display unit 28.

In step S22, the system control unit 50 determines whether line-of-sight information can be acquired by the line-of-sight acquisition determination unit according to the present exemplary embodiment. In the display unit 28, the eye sensor installed on the EVF determines whether line-of-sight information can be acquired based on information indicating whether the user' eye is in contact with the eyepiece or is separated from the eyepiece. If the user is viewing an object through the EVF, the eye sensor indicates that the user's eye is in contact with the eyepiece, and the line-of-sight input operation unit 701 serving as the line-of-sight acquisition unit according to the present exemplary embodiment determines that line-of-sight information can be acquired. On the other hand, if the user is not viewing an object through the EVF, the eye sensor indicates that the user's eye is separated from the eyepiece, and the line-of-sight input operation unit 701 serving as the line-of-sight acquisition unit according to the present exemplary embodiment determines that line-of-sight information cannot be acquired. In the display unit 28, the TFT liquid crystal display can also determine whether line-of-sight information can be acquired through the line-of-sight input operation unit 701.

If the system control unit 50 determines that line-of-sight information can be acquired in step S22, in step S23, line-of-sight detection processing is started. In step S24 and subsequent steps, the line-of-sight input operation unit 701 associates with the display image observed by the user the position (line-of-sight position) on the display unit 28 that is observed by the user, and acquires and accumulates line-of-sight information at predetermined time intervals. If it is determined that line-of-sight information cannot be acquired in step S22, line-of-sight information is not acquired or accumulated at the determined timing.

In step S24, it is determined whether the number of times the line-of-sight information has been acquired and accumulated in step S23 is more than or equal to the predetermined number of times N. The predetermined number of times N is determined depending on the number of line-of-sight state determinations to be performed in the subsequent step S25. In this case, if it is determined that line-of-sight information cannot be acquired in step S22, no line-of-sight information is acquired and accumulated, and this determination is not counted as the predetermined number of times N in step S24. If the number of times line-of-sight information has been acquired and accumulated in step S23 is more than or equal to the predetermined number of times N (YES in step S24), the line-of-sight state determination in step S5, which is a line-of-sight state determination method according to the present exemplary embodiment, can be performed, and then, the processing proceeds to step S25. If it is determined that the number of times line-of-sight information has been acquired and accumulated in step S23 is less than the predetermined number of times N (NO in step S24), the line-of-sight state determination in step S5 cannot be performed, and then step S25 is skipped and the processing proceeds to step S26.

In step S25, the line-of-sight state determination is performed as the line-of-sight state determination method according to the present exemplary embodiment. The line-of-sight state determination in step S25 will be described below with reference to a line-of-sight state determination sub-flowchart illustrated in FIG. 9.

In step S26, the display unit 28 is caused to display the line-of-sight position using the line-of-sight position information acquired in step S23 or step S25. If it is determined that the line-of-sight information accumulation number of times is more than or equal to the predetermined number of times N in step S24, the line-of-sight position acquired in step S25 is used. If it is determined that the line-of-sight information accumulation number of times is less than the predetermined number of times N in step S24, the line-of-sight position acquired in step S23 is used.

In step S27, it is determined whether the line-of-sight determination operation is performed by the user. If the line-of-sight determination operation is performed by the user (YES in step S27), the display of the line-of-sight position on the display unit 28 is stopped, and then the line-of-sight position state determination and display processing is terminated. The line-of-sight position may be continuously displayed on the display unit 28, or the display method may be changed. If the line-of-sight determination operation is not performed by the user (NO in step S27), the processing returns to step S22 so that the line-of-sight acquisition determination unit according to the present exemplary embodiment determines whether line-of-sight information can be acquired, and then new line-of-sight information is acquired. If the line-of-sight determination operation is performed by the user in step S27, the number of times line-of-sight information has been acquired and accumulated in step S13 and line-of-sight position change information $\Delta S_j$ are reset. After the completion of the series of operations in the flowchart, the processing proceeds to step S2 in the main flowchart of FIG. 6.

[Description of Line-of-Sight State Determination]

Figure 9:
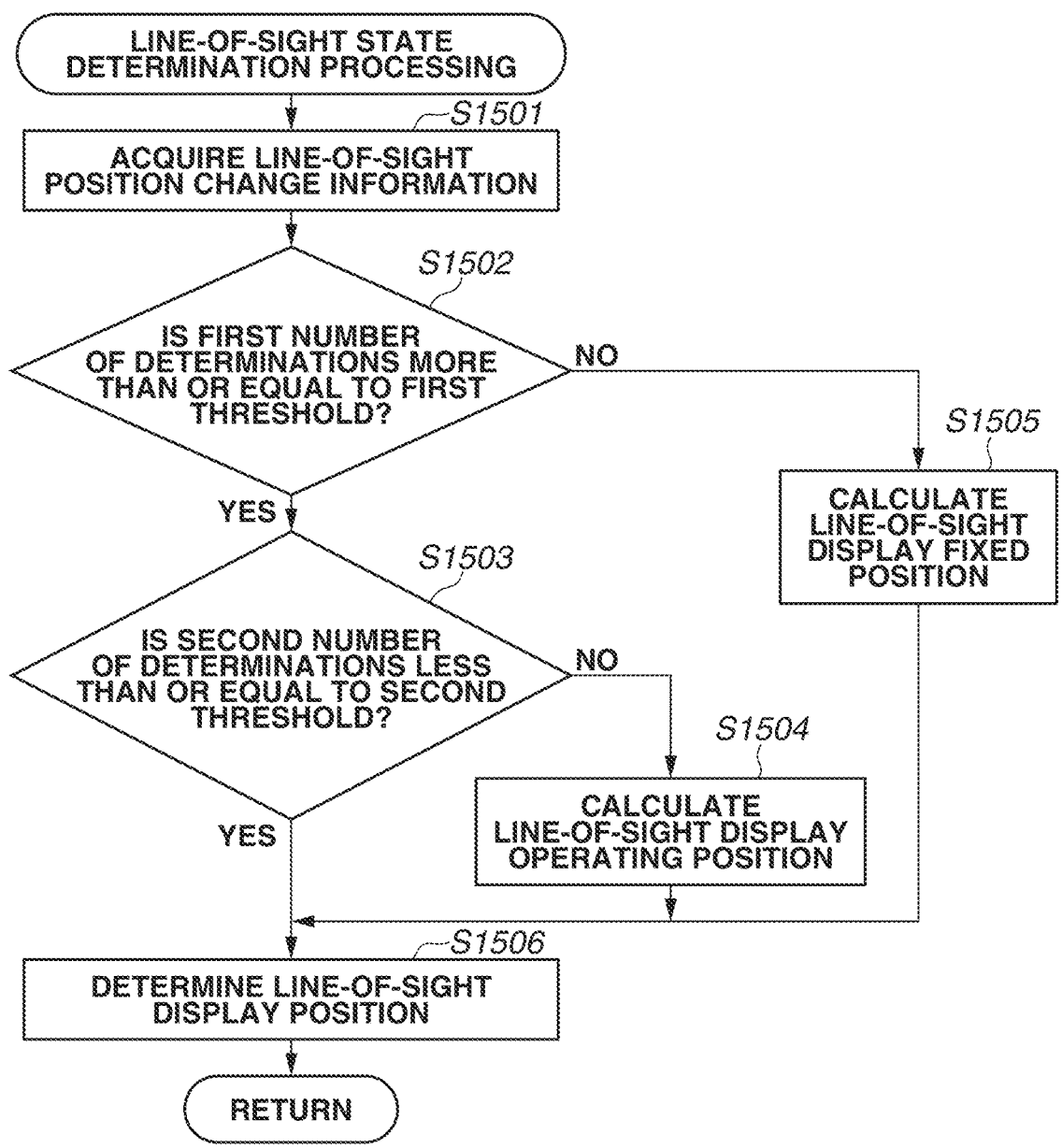
FIG. 9 is a flowchart illustrating line-of-sight state determination processing according to one or more aspects of the present disclosure.

A series of operations in the sub-flowchart illustrated in FIG. 9 is also mainly implemented by the system control unit 50.

In step S1501, the line-of-sight position change information $\Delta S_j$ is acquired using line-of-sight position information $S_i$ acquired in step S23 illustrated in FIG. 8. In step S14 illustrated in FIG. 8, when it is determined that the number of times line-of-sight information has been acquired and accumulated is more than or equal to the predetermined number of times N, $\Delta_{jH}$ corresponding to a horizontal position variation, $\Delta S_{jV}$ corresponding to a vertical position variation, and $\Delta S_{jr}$ corresponding to a point-to-point position variation in the line-of-sight position change information $\Delta S_j$ are calculated by the following Expressions (1), (2), and (3), respectively.

$$S_i = \{x_i, y_i\}$$

$$\Delta S_{jH} = x_{j+1} - x_j (j=1 \sim N-1) \quad (1)$$

$$\Delta S_{jV} = y_{j+1} - y_j (j=1 \sim N-1) \quad (2)$$

$$\Delta S_{jr} = \sqrt{(x_{j+1}-x_j)^2 + (y_{j+1}-y_j)^2} (j=1 \sim N-1) \quad (3)$$

In step S1502, the line-of-sight position change information $\Delta S_j$ acquired in step S1501 is determined using the first determination number of times $JN_1$ according to the present exemplary embodiment and a first threshold $Th_1$ according to the present exemplary embodiment. The predetermined number of times N and the determination number of times $JN_1$ have a relationship as represented by the following Expression (4).

$$N \geq JN_1 \quad (4)$$

While the present exemplary embodiment illustrates an example where the first determination number of times $JN_1$ is a fixed value "5", the first determination number of times $JN_1$ may be changed depending on conditions. In step S1502, if the line-of-sight position change information $\Delta S_j$ acquired in step S1501 includes determination time and if it is determined that the determination is previously performed in succession the first determination number of times $JN_1$ according to the present exemplary embodiment and the line-of-sight position change information $\Delta S_j$ is less than or equal to the first threshold $Th_1$ according to the present exemplary embodiment, the line-of-sight position to be displayed on the display unit 28 is statically displayed (is not moved). Then, the processing proceeds to step S1505. If it is determined that the line-of-sight position change information $\Delta S_j$ acquired in step S1501 includes determination time and if it is determined at least once that the line-of-sight position change information $\Delta S_j$ is more than or equal to the first threshold $Th_1$ according to the present exemplary embodiment within the first determination number of times $JN_1$ of previous determinations according to the present exemplary embodiment, the determination is performed using a second threshold according to the present exemplary embodiment. Then, the processing proceeds to step S1503.

A static state determination method for statically displaying the line-of-sight position in step S1502 and a display fixed position calculation method will now be described with reference to FIGS. 10A to 10C and FIGS. 11A to 11C. FIGS. 10A to 10C each illustrate an example where a moving image that has been captured or a moving image that is being captured is displayed on the display unit 28 and the user performs the line-of-sight determination operation on a specific object while focusing the user's line of sight on the object. A line-of-sight information display stopping method using the first determination number of times $JN_1$ according to the present exemplary embodiment and the first threshold $Th_1$ according to the present exemplary embodiment will be described. FIG. 10A illustrates an image displayed on the display unit 28 at time $t_1$. FIG. 10B illustrates an image displayed on the display unit 28 at time $t_2$. FIG. 10C illustrates an image displayed on the display unit 28 at time $t_3$. Sm represents a line-of-sight information display, and Trg represents an object followed by the user's line of sight.

FIG. 10A illustrates a state where the object Trg riding on a bicycle has moved from the left side of the screen.

FIG. 10A also illustrates a state where the user has recognized the object Trg and starts to focus the line of sight on the object Trg. At this moment, the line-of-sight information display Sm does not coincide with the object Trg and the line-of-sight information display Sm is varied in position as indicated by dashed lines.

FIG. 10B illustrates a moment when the object Trg gradually reduces the speed of the bicycle to stop. FIG. 10B also illustrates the object Trg and the line-of-sight information display Sm at time $t_2$ after the lapse of time $t_1$ in FIG. 10A. At this moment, the line-of-sight information display Sm starts to substantially coincide with the object Trg, while the line-of-sight information display Sm is varied in position as indicated by dashed lines.

FIG. 10C illustrates a moment when the object Trg stops driving the bicycle. FIG. 10C also illustrates the object Trg and the line-of-sight information display Sm at time $t_3$ after the lapse of time $t_2$ in FIG. 10B. At this moment, the line-of-sight information display Sm coincides with the object Trg and the line-of-sight information display Sm is statically displayed using the first determination number of times $JN_1$ according to the present exemplary embodiment and the first threshold $Th_1$ according to the present exemplary embodiment.

Figure 11A:
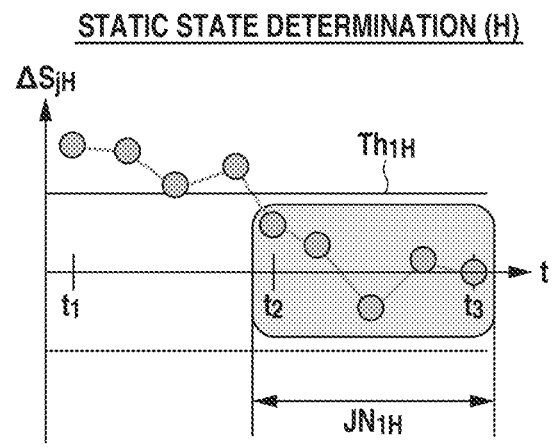
FIGS. 11A to 11C each illustrate stop determination in the line-of-sight state determination processing according to one or more aspects of the present disclosure.
Figure 11B:
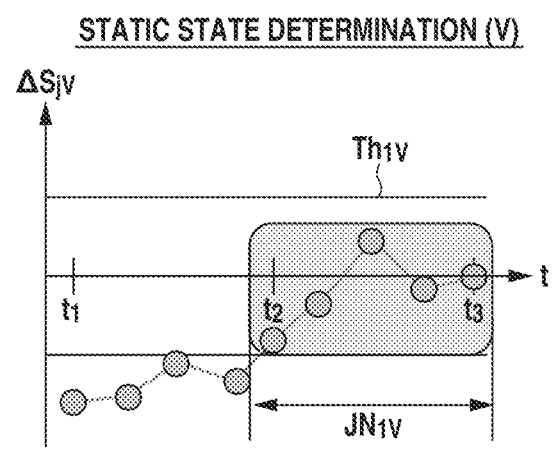
Figure 11C:
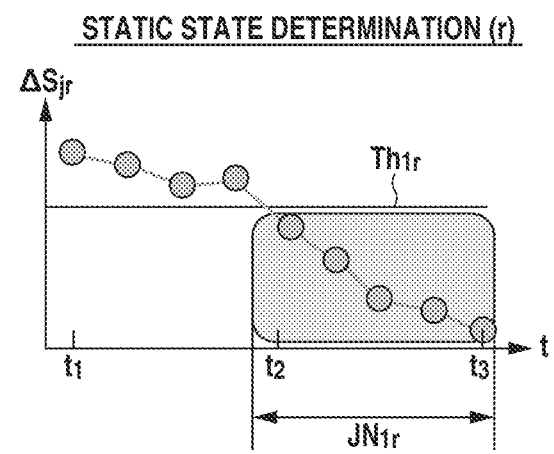

Next, a series of operations illustrated in FIG. 10 will be described using the line-of-sight position change information $\Delta S_j$ according to the present exemplary embodiment, the first determination number of times $JN_1$ according to the present exemplary embodiment, and the first threshold $Th_1$ according to the present exemplary embodiment illustrated in FIGS. 11A to 11C. FIGS. 11A to 11C each illustrate the static state determination using the first determination number of times $JN_1$ according to the present exemplary embodiment and the first threshold $Th_1$ according to the present exemplary embodiment. FIGS. 11A to 11C illustrate an example where the first determination number of times $JN_1$ according to the present exemplary embodiment is five. However, the first determination number of times $JN_1$ is not limited to five and may be changed depending on user's line-of-sight characteristics, a browsing state of the display unit 28, or manual operations by the user.

FIG. 11A illustrates $\Delta S_{jH}$ corresponding to the horizontal position variation in the line-of-sight position change information $\Delta S_j$ along the axis of time t. Two horizontal solid lines represent a threshold $Th_{1H}$ for the horizontal position variation in the first threshold $Th_1$ according to the present exemplary embodiment. A gray hatched area represents the determination number of times $JN_{1H}$ for the horizontal position variation within the first determination number of times $JN_1$ according to the present exemplary embodiment.

FIG. 11B illustrates $\Delta S_{jV}$ corresponding to the vertical position variation in the line-of-sight position change information $\Delta S_j$ along the axis of time t. Two horizontal solid lines represent a threshold $Th_{1V}$ for the vertical position variation in the first threshold $Th_1$ according to the present exemplary embodiment. A gray hatched area represents the determination number of times $JN_{1V}$ for the horizontal position variation within the first determination number of times $JN_1$ according to the present exemplary embodiment.

FIG. 11C illustrates $\Delta S_{jr}$ corresponding to the point-to-point position variation in the line-of-sight position change information $\Delta S_j$ along the axis of time t. Two horizontal solid lines represent a threshold $Th_{1r}$ for the point-to-point position variation in the first threshold $Th_1$ according to the present exemplary embodiment. A gray hatched area represents a determination number of times $JN_{1r}$ for the point-to-position position variation within the first determination number of times $JN_1$ according to the present exemplary embodiment.

FIG. 11A illustrates a case where the static state determination of the line-of-sight information display is performed using the line-of-sight position change information $\Delta S_{jH}$ corresponding to the horizontal position variation. The line-of-sight position change information $\Delta S_{jH}$ corresponding to the horizontal position variation from time $t_1$ to time $t_2$ gradually decreases, but is still more than the threshold $Th_{1H}$ for the horizontal position variation. After that, the line-of-sight position change information $\Delta S_{jH}$ corresponding to the horizontal position variation from time $t_2$ to time $t_3$ transitions within the range of the threshold $Th_{1H}$ for the horizontal position variation and converges with time. In this case, since the line-of-sight position change information $\Delta S_{jH}$ is within the range of the threshold $Th_{1H}$ for the horizontal position variation from time $t_2$, the counter value is incremented. The present exemplary embodiment is described assuming that the determination number of times $JN_{1H}$ for the horizontal position variation is five. Thus, the line-of-sight information display on the display unit 28 is changed at time $t_3$, which is the fifth time, to statically display the line-of-sight information as a fixed value. The fixed value corresponding to the display fixed position is an average value of the determination numbers of times $JN_{1H}$ for the horizontal position variation. The last value of the determination numbers of times $JN_{1H}$ for the horizontal position variation may be used as the fixed value.

FIG. 11B illustrates a case where the static state determination of the line-of-sight information display is performed using the line-of-sight position change information $\Delta S_{jV}$ corresponding to the vertical position variation. The line-of-sight position change information $\Delta S_{jV}$ corresponding to the vertical position variation from time $t_1$ from time $t_2$ indicates gradually decreases, but is still lower than the threshold $Th_{1V}$ for the vertical position variation. After that, the line-of-sight position change information $\Delta S_{jV}$ corresponding to the vertical position variation from time $t_2$ to time $t_3$ transitions within the range of the threshold $Th_{1V}$ for the vertical position variation and converges with time. In this case, since the line-of-sight position change information $\Delta S_{jV}$ is within the threshold $Th_{1V}$ for the vertical position variation from time $t_2$, the counter value is incremented. The present exemplary embodiment is described assuming that the determination number of times $JN_{1V}$ for the vertical position variation is five. Then, the line-of-sight information display on the display unit 28 is changed at time $t_3$, which is the fifth time, to statically display the line-of-sight information as a fixed value. The fixed value corresponding to the display fixed position is an average value of the determination numbers of times $JN_{1V}$ for the vertical position variation. The last value of the determination numbers of times $JN_{1V}$ for the vertical position variation may be used as the fixed value.

FIG. 11C illustrates a case where the static state determination of the line-of-sight information display is performed using the line-of-sight position change information $\Delta S_{jr}$ corresponding to the point-to-point position variation. Unlike the above-described information $\Delta S_{jH}$ and $\Delta S_{jV}$, $\Delta S_{jr}$ takes positive values, and thus the threshold $Th_{1r}$ for the point-to-point position variation takes positive values alone. The line-of-sight position change information $\Delta S_{jr}$ corresponding to the point-to-point position variation from time $t_1$ to time $t_2$ gradually decreases, but is still more than the threshold $Th_{1r}$ for the point-to-point position variation. After that, the line-of-sight position change information $\Delta S_{jr}$ corresponding to the point-to-point position variation from time $t_2$ to time $t_3$ transitions within the range of the threshold $Th_{1r}$ for the point-to-point position variation and converges with time. In this case, since the line-of-sight position change information $\Delta S_{jr}$ is within the threshold $Th_{1r}$ for the point-to-point position variation from time $t_2$, the counter value is incremented. The present exemplary embodiment is described assuming that the determination number of times $JN_{1r}$ for the point-to-point position variation is five. Then, the line-of-sight information display on the display unit 28 is changed at time $t_3$, which is the fifth time, to statically display the line-of-sight information as a fixed value. The fixed value corresponding to the display fixed position is an average value of the determination numbers of times $JN_{1r}$ for the point-to-point position variation.

A position determined based on the last value of the determination numbers of times $JN_{1r}$ for the point-to-point position variation may be used as the fixed value.

As described above, an electronic apparatus provides an improved display quality and user-friendliness by the static display of the line-of-sight information based on variations in the line-of-sight information.

In step S1503, the line-of-sight position change information $\Delta S_j$ acquired in step S1501 is determined using the second determination number of times $JN_2$ according to the present exemplary embodiment and a second threshold $Th_2$ according to the present exemplary embodiment. The predetermined number N and the second determination number of times $JN_2$ have a relationship as represented by the following Expression (5).

$$N \geq JN_2 \quad (5)$$

While the present exemplary embodiment illustrates an example where the second determination number of times $JN_2$ is a fixed value "5", the second determination number of times $JN_2$ may be changed depending on conditions. In step S1503, if the line-of-sight position change information $\Delta S_j$ acquired in step S1501 includes determination time and if it is determined that the determination is previously performed in succession the second determination number of times $JN_2$ according to the present exemplary embodiment and the line-of-sight position change information $\Delta S_j$ is more than or equal to the second threshold $Th_2$ according to the present exemplary embodiment, the line-of-sight position to be displayed on the display unit 28 is dynamically displayed (is moved). Then, the processing proceeds to step S1504 to calculate the motion start position. If it is determined that the line-of-sight position change information $\Delta S_j$ acquired in step S1501 includes determination time and if it is determined at least once that the line-of-sight position change information $\Delta S_j$ is less than or equal to the second threshold $Th_2$ according to the present exemplary embodiment within the second determination number of times $JN_2$ of previous determinations according to the present exemplary embodiment, the previous display is not changed. Then, the processing proceeds to step S1506 to determine the line-of-sight display position to be displayed on the display unit 28 using the line-of-sight position information $S_i$ acquired in step S13.

Figure 12A:
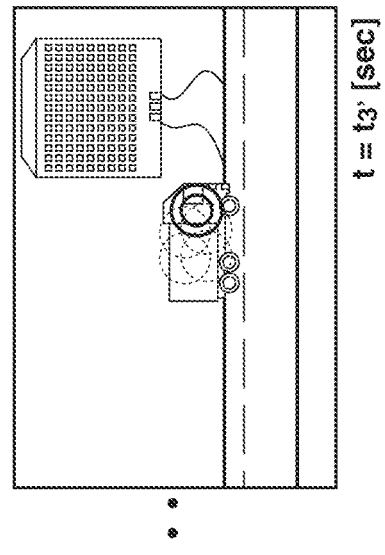
FIGS. 12A to 12C each illustrate motion start determination in the line-of-sight state determination processing according to one or more aspects of the present disclosure.
Figure 12B:
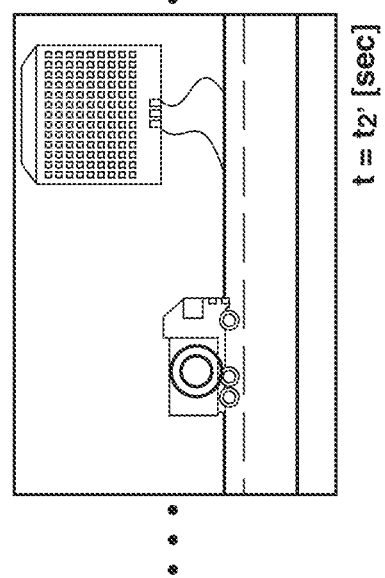
Figure 12C:
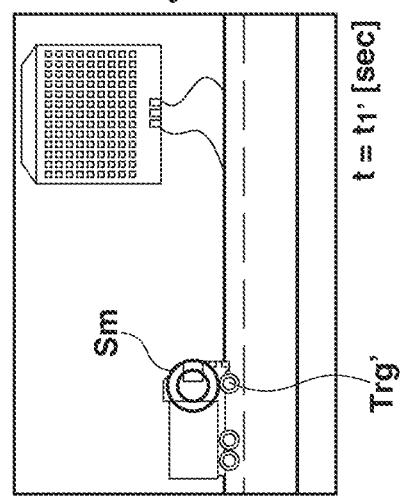

A motion start determination method for starting to dynamically display the line-of-sight position in step S1503 and a display fixed position calculation method will now be described with reference to FIGS. 12A to 12C and 13A to 13C. FIGS. 12A to 12C illustrate an example where a moving image that has been captured or a moving image that is being captured is displayed on the display unit 28 and the user performs the line-of-sight determination operation on a specific object while focusing the user's line of sight on the object. A line-of-sight information display stopping method using the second determination number of times $JN_2$ according to the present exemplary embodiment and the second threshold $Th_2$ according to the present exemplary embodiment will be described. FIG. 12A illustrates an image displayed on the display unit 28 at time $t_1$. FIG. 12B illustrates an image displayed on the display unit 28 at time $t_2$. FIG. 12C illustrates an image displayed on the display unit 28 at time $t_3$. Sm represents a line-of-sight information display like in FIG. 12, and Trg' represents an object that is different from the object illustrated in FIG. 12 and is followed by the user's line of sight.

FIG. 12A illustrates a moment when the object Trg', which is a car, starts to move from the left side of the screen. FIG. 12A also illustrates a state where the user continuously recognizes the object Trg' and focuses the user's line of sight on the object Trg'. At this moment, the line-of-sight information display Sm coincides with the object Trg', and the line-of-sight information display Sm is statically displayed by the processing in step S1502 described above. Prior to the processing in step S1502, the line-of-sight information display Sm can be operated.

FIG. 12B illustrates a moment when the object Trg' has started to move and is accelerating. FIG. 12B also illustrates the object Trg' and the line-of-sight information display Sm at time $t_2$, after a lapse of time $t_1$, in FIG. 12A. At this moment, the line-of-sight information display Sm starts to be separated from the object Trg', while the line-of-sight information display Sm is statically displayed by the processing in step S1502 described above.

Prior to the processing in step S1502, the line-of-sight information display Sm can be operated.

FIG. 12C illustrates a moment when the object Trg', the vehicle, has stopped. FIG. 12C also illustrates the object Trg' and the line-of-sight information display Sm at time $t_3$, after the lapse of the time $t_2$, in FIG. 12B. At this moment, the line-of-sight information display Sm coincides with the object Trg' and the line-of-sight information display Sm is dynamically displayed using the second determination number of times $JN_2$ according to the present exemplary embodiment and the second threshold $Th_2$ according to the present exemplary embodiment and is varied in position as indicated by dashed lines.

Figure 13A:
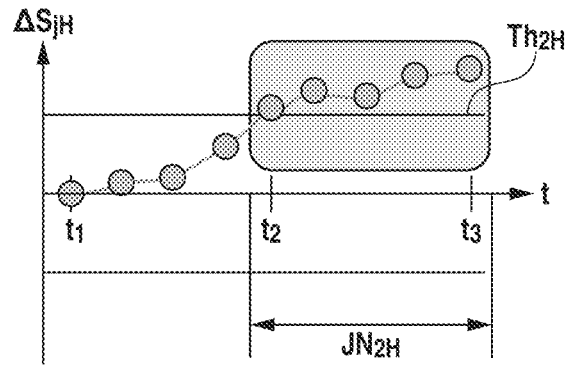
FIGS. 13A to 13C each illustrate motion start determination in the line-of-sight state determination processing according to one or more aspects of the present disclosure.
Figure 13B:
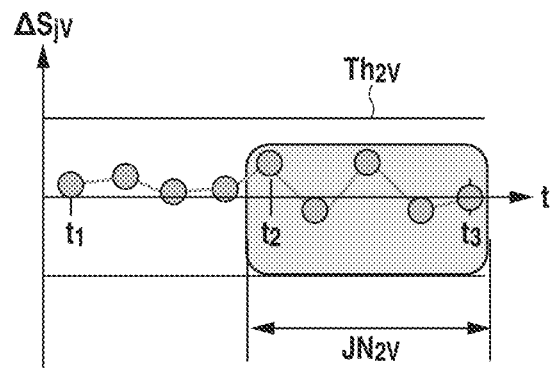
Figure 13C:
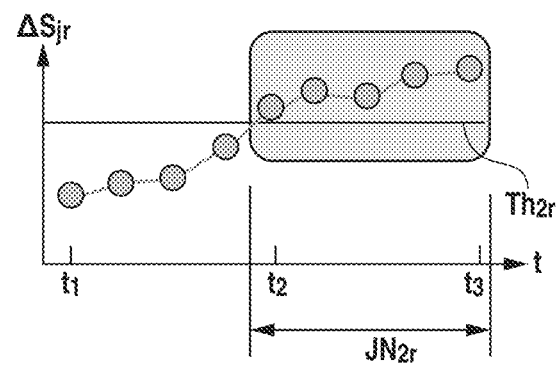

Next, a series of operations illustrated in FIG. 12 will be described using the line-of-sight position change information $\Delta S_j$ according to the present exemplary embodiment, the second determination number of times $JN_2$ according to the present exemplary embodiment, and the second threshold $Th_2$ according to the present exemplary embodiment illustrated in FIGS. 13A to 13C. FIGS. 13A to 13C each illustrate the static state determination using the second determination number of times $JN_2$ according to the present exemplary embodiment and the second threshold $Th_2$ according to the present exemplary embodiment. FIGS. 13A to 13C illustrate an example where the second determination number of times $JN_2$ according to the present exemplary embodiment is five. However, the second determination number of times $JN_2$ is not limited to five and may be changed depending on user's line-of-sight characteristics, a browsing state of the display unit 28, or manual operations by the user.

FIG. 13A illustrates $\Delta S_{jH}$ corresponding to the horizontal position variation in the line-of-sight position change information $\Delta S_j$ along the axis of time t'. Two horizontal solid lines represent a threshold $Th_{2H}$ for the horizontal position variation in the second threshold $Th_2$ according to the present exemplary embodiment. A gray hatched area represents the determination number of times $JN_{2H}$ for the horizontal position variation in the second determination number of times $JN_2$ according to the present exemplary embodiment.

FIG. 13B illustrates $\Delta S_{jV}$ corresponding to the vertical position variation in the line-of-sight position change information $\Delta S_j$ along the axis of time t'. Two horizontal solid lines indicate a threshold $Th_{2V}$ for the vertical position variation in the second threshold $Th_2$ according to the present exemplary embodiment. A gray hatched area represents the determination number of times $JN_{2V}$ for the horizontal position variation in the second determination number of times $JN_2$ according to the present exemplary embodiment.

FIG. 13C illustrates $\Delta S_{jr}$ corresponding to the point-to-point position variation in the line-of-sight position change information $\Delta S_j$ along the axis of time t'. Two horizontal solid lines represent a threshold $Th_{2r}$ for the point-to-point position variation in the second threshold $Th_2$ according to the present exemplary embodiment. A gray hatched area represents the determination number of times $JN_{2r}$ for the point-to-point position variation in the second determination number of times $JN_2$ according to the present exemplary embodiment.

FIG. 13A illustrates a case where the static state determination of the line-of-sight information display is performed using the line-of-sight position change information $\Delta S_{jH}$ corresponding to the horizontal position variation. The line-of-sight position change information $\Delta S_{jH}$ corresponding to the horizontal position variation from time $t_1$, to time $t_2$, gradually increases and is about to exceed the threshold $Th_{1H}$ for the horizontal position variation. After that, the line-of-sight position change information $\Delta S_{jH}$ corresponding to the horizontal position variation from time $t_2$, to time $t_3$, transitions within the range of the threshold $Th_{2H}$ for the horizontal position variation and moves along with the object Trg' with time. In this case, since the line-of-sight position change information $\Delta S_{jH}$ is within the range of the threshold $Th_{2H}$ for the horizontal position variation from time $t_2$, the counter value is incremented. The present exemplary embodiment is described assuming that the determination number of times $JN_{2H}$ for the horizontal position variation is five. Then, the line-of-sight information display on the display unit 28 is changed at time $t_3$, which is the fifth time, to dynamically display the line-of-sight information as a fixed value. The value for the display corresponding to the display fixed position is an average value of the determination numbers of times $JN_{2H}$ for the horizontal position variation. The last value of the determination numbers of times $JN_{2H}$ for the horizontal position variation may be used as the fixed value. Even when the line-of-sight position change information $\Delta S_{jH}$ corresponding to the horizontal position variation transitions within the range of the threshold $Th_{2H}$ for the horizontal position variation, the line-of-sight information may be dynamically displayed in the following case. That is, if the object constantly moves in the same direction the determination number of times $JN_{2H}$ for the horizontal position variation, the line-of-sight information display may be changed to dynamically display the line-of-sight information.

FIG. 13B illustrates a case where the static state determination of the line-of-sight information display is performed using the line-of-sight position change information $\Delta S_{jV}$ corresponding to the vertical position variation. The line-of-sight position change information $\Delta S_{jV}$ corresponding to the vertical position variation from time $t_{1'}$ to time $t_{2'}$ has a substantially constant value and is constantly lower than the threshold $Th_{2V}$ for the vertical position variation. In this case, the line-of-sight position change information $\Delta S_{jV}$ is within the range of the threshold $Th_{2V}$ for the vertical position variation from time $t_{2'}$, and thus the counter value is not incremented. Thus, in the line-of-sight position change information $\Delta S_{jV}$ corresponding to the vertical position variation, the line-of-sight information to be displayed on the display unit 28 is determined to be statically displayed as a fixed value also at time $t_{3'}$.

FIG. 13C illustrates a case where the static state determination of the line-of-sight information display is performed using the line-of-sight position change information $\Delta S_{jr}$ corresponding to the point-to-point position variation. Unlike the above-described information $\Delta S_{jH}$ and $\Delta S_{jV}$, $\Delta S_{jr}$ takes positive values, and thus the threshold $Th_{2r}$ for the point-to-point position variation takes positive values alone. The line-of-sight position change information $\Delta S_{jr}$ corresponding to the point-to-point position variation time $t_{1'}$ to time $t_{2'}$ gradually increases, but is still less than the threshold $Th_{2r}$ for the point-to-point position variation. After that, the line-of-sight position change information $\Delta S_{jr}$ corresponding to the point-to-point position variation from time $t_{2'}$ to time $t_{3'}$ transitions within the range of the threshold $Th_{2r}$ for the point-to-point position variation, and changes with time. In this case, since the line-of-sight position change information $\Delta S_{jr}$ is more than or equal to the threshold $Th_{2r}$ for the point-to-point position variation from time $t_{2'}$, and thus the counter value is incremented. The present exemplary embodiment is described assuming that the determination number of times $JN_{2r}$ for the point-to-point position variation is five. Then, the line-of-sight information display on the display unit 28 is changed at time $t_{3'}$, which is the fifth time, to dynamically display the line-of-sight information as a fixed value. The value for the display corresponding to the display fixed position is an average value of the determination numbers of times $JN_{2r}$ for the point-to-point position variation. A position determined based on the last value of the determination numbers of times $JN_{2r}$ for the point-to-point position variation may be used as the fixed value.

As described above, an electronic apparatus provides an improved display quality and user-friendliness by dynamic display of the line-of-sight information depending on variations in the line-of-sight information.

While FIGS. 12A to 12C and FIGS. 13A to 13C illustrate a determination method using the line-of-sight position variation $\Delta S_j$, a static state determination and operation determination may be further performed depending on whether the direction in which the line-of-sight position has changed falls within a predetermined range. For example, angles of ±45 degrees can be selected as the predetermined range. This enables determination of a state where the user's line of sight is varied.

The processing in step S1504 is performed if it is determined that the line-of-sight position change information is more than or equal to the second threshold $Th_2$ according to the present exemplary embodiment in step S1503. In step S1504, the motion start position of the line-of-sight display is calculated, and then the processing proceeds to step S1506.

The processing in step S1505 is performed if it is determined that the line-of-sight position change information is less than or equal to the first threshold $Th_1$ according to the present exemplary embodiment in step S1502. In step S1505, the fixed position of the line-of-sight display is calculated, and then the processing proceeds to step S1506. After the completion of the series of operations in the flowchart, the processing proceeds to step S26 in the main flowchart of FIG. 8.

[Descriptions of Line-of-Sight Detection and Dynamic Calibration Method]

Figure 14:
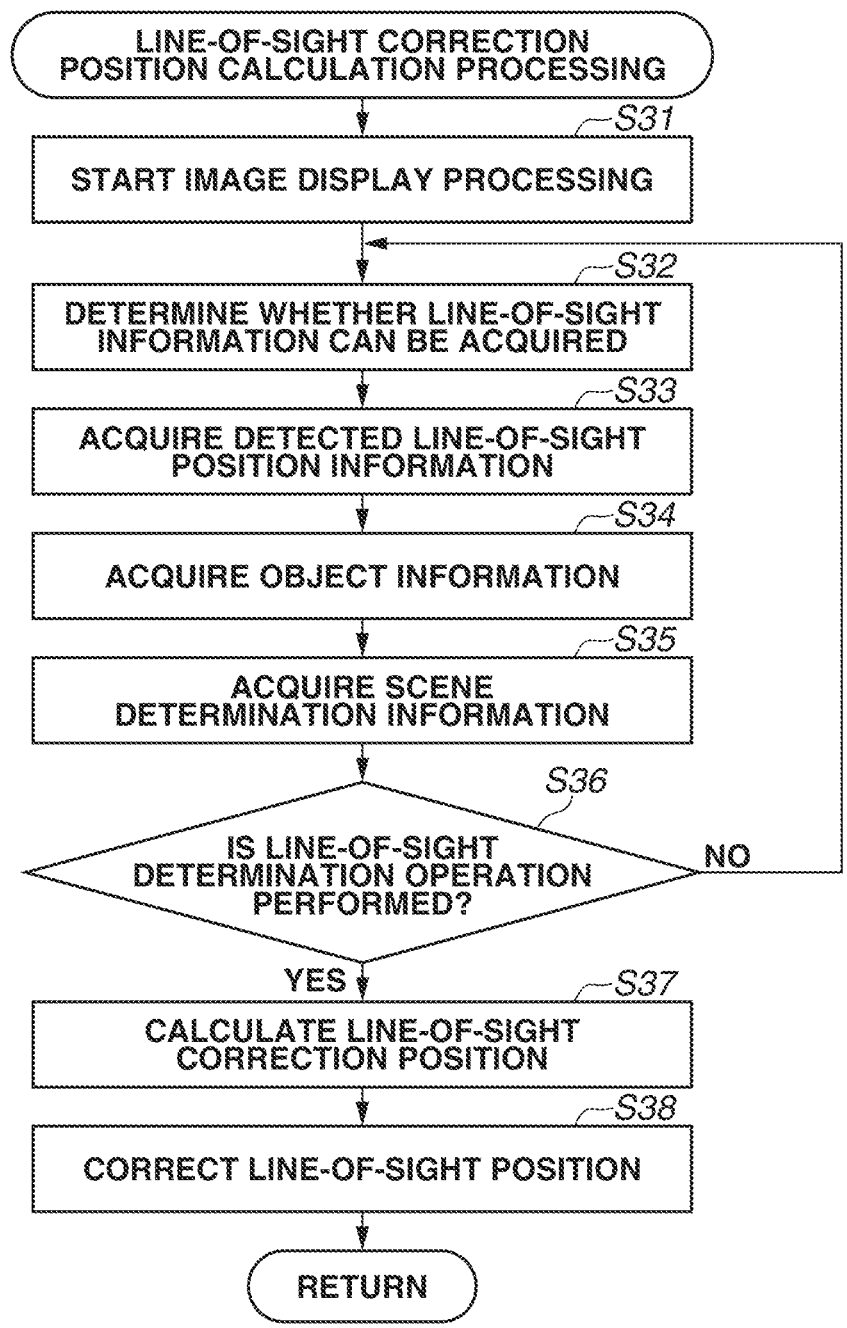
FIG. 14 is a main flowchart illustrating a line-of-sight detection processing method and a line-of-sight position correction method for an image capturing apparatus according to one or more aspects of the present disclosure.

A line-of-sight position correction method according to the present exemplary embodiment will be described with reference to FIG. 14 and FIGS. 15A to 15C. FIG. 14 is a sub-flowchart illustrating a line-of-sight detection processing method and a line-of-sight position correction method for the image capturing apparatus according to the present exemplary embodiment. FIG. 14 illustrates an operation performed when the user performs the line-of-sight determination operation while viewing the image displayed on the display unit 28 serving as the display unit according to the present exemplary embodiment, to thereby implement a focus adjustment method. The operation illustrated in FIG. 14 is mainly implemented by the system control unit 50. The present exemplary embodiment is described with reference to the block diagram of the image capturing apparatus illustrated in FIG. 1. This operation can also be performed in an electronic apparatus including at least the system control unit 50, the display unit 28, or the operation unit 70.

The pieces of processing in steps S31 to S33 is similar to those in steps S21 to S23, respectively.

In step S34, the object detection unit according to the present exemplary embodiment is used to acquire object position information according to the present exemplary embodiment as object position information displayed on the display unit 28, the number of detected objects, the type of each of the detected objects, and the size of each of the detected objects. Captured image rating information is also acquired. In this case, a value determined by the camera based on focus information or the like, or a manual value determined by the user may be acquired as the rating information. These pieces of object information are updated every time the scene changes, for example, due to a camera panning operation. The object information may be updated every time the scene changes, or may be updated merely when a change occurs based on information indicating whether the object information acquired in the previous frame is updated for each frame in continuous shooting. After these pieces of object information are acquired, the processing proceeds to step S35.

In step S35, camera operation information obtained in image capturing of a scene displayed on the display unit 28 and object operation information displayed on the display unit 28 are acquired using a scene determination information acquisition unit according to the present exemplary embodiment. Examples of information obtained as camera operation information in image capturing include panning information acquired using a gyroscope sensor, lens information, such as a lens focal length and a zoom position, shutter settings for single shooting or continuous shooting, and camera setting information such as Time-value mode (Tv) or International Organization for Standardization (ISO). Examples of information acquired as the object operation information include an in-plane movement speed $v_t$ of the object on the display unit 28, a motion vector $V_t$, and movement locus information $P_t$ at plurality of previous points. After the acquisition of the camera operation information and the object operation information, the processing proceeds to step S36.

In step S36, it is determined whether the line-of-sight determination operation is performed by the user. If the line-of-sight determination operation is performed by the user (YES in step S36), the line-of-sight position to be displayed on the display unit 28 is statically displayed, and then the processing proceeds to step S37 to correct the line-of-sight position by the line-of-sight correction position calculation unit according to the present exemplary embodiment. The line-of-sight position may be continuously displayed on the display unit 28, or the display method may be changed. If the line-of-sight determination operation is not performed by the user (NO in step S36), the processing returns to step S32 to determine whether line-of-sight information can be acquired by the scene determination information acquisition unit according to the present exemplary embodiment.

Figure 15A:
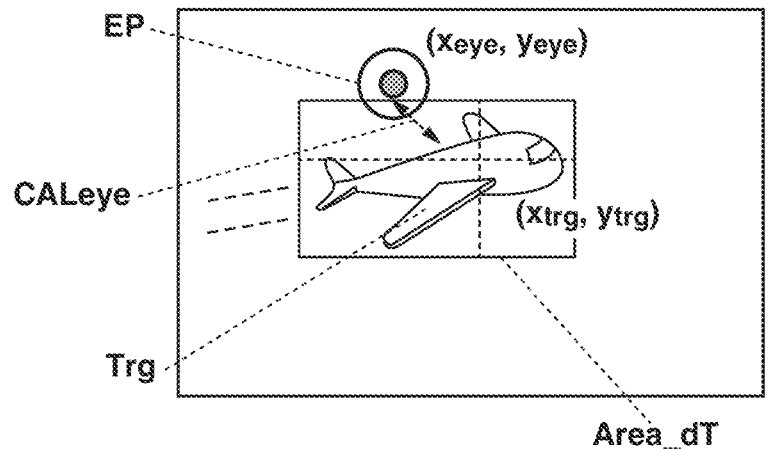
FIGS. 15A to 15C each illustrate the line-of-sight position correction method.
Figure 15B:
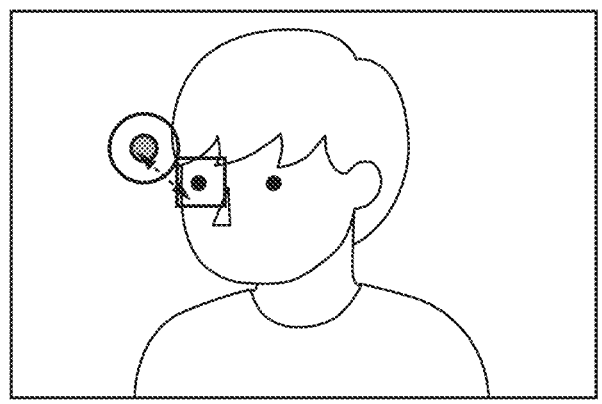
Figure 15C:
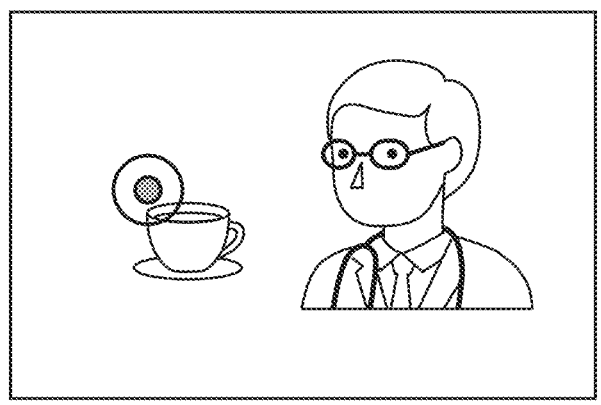

In step S37, the line-of-sight position correction value is calculated by the line-of-sight correction position calculation unit according to the present exemplary embodiment. A line-of-sight position correction unit in the line-of-sight correction position calculation unit according to the present exemplary embodiment will now be described with reference to FIGS. 15A to 15C. FIGS. 15A to 15C illustrate various scenes on the display unit 28 when the line-of-sight correction position calculation unit according to the present exemplary embodiment is used. EP represents a line-of-sight display indicating the user's line-of-sight position. In this case, the coordinates of the line-of-sight position displayed on the display unit 28 are represented by ($x_{eye}$, $y_{eye}$). Trg represents a detected object. Area_dT represents the range of the object Trg. The coordinates of the object Trg are represented by ($x_{trg}$, $y_{trg}$). $CAL_{eye}$ represents a line-of-sight position value to be divided into a horizontal position correction value and a vertical position correction value.

$$CAL_{eye}=(x_{cal}, y_{cal}) \qquad (1)$$

$CAL_{eye}$ can be represented by Expression (1).

FIG. 15A illustrates a moment when the user has focused the line of sight on a flying plane and the line of sight has been fixed. In FIG. 15A, the line-of-sight position coordinates ($x_{eye}$, $y_{eye}$) are displayed at a position different from the position indicated by the Trg coordinates ($x_{trg}$, $y_{trg}$). In this case, it can be considered that the user has fixed the line of sight after recognizing the plane, which causes the difference between the two coordinates corresponds to the amount of error. For this reason, a dynamic calibration operation is carried out using line-of-sight information, object information, and scene determination information based on the difference between the two coordinates. If no object is detected by the object detection unit according to the present exemplary embodiment, the Trg coordinates ($x_{trg}$, $y_{trg}$) cannot be acquired, and thus it is determined that the dynamic calibration operation will not be performed.

First, line-of-sight reliability information acquired in step S32 is used as the line-of-sight information. The value of a line-of-sight gain $Gain_{eye}$ in the line-of-sight position correction value calculation varies depending on the line-of-sight reliability information. If the line-of-sight reliability information is low, i.e., when $Gain_{eye}<1$ holds, it can be considered that the acquired line-of-sight position coordinates ($x_{eye}$, $y_{eye}$) have a large amount of error due to some reason, and thus the acquired line-of-sight position coordinates ($x_{eye}$, $y_{eye}$) cannot be used. On the other hand, if the line-of-sight reliability information is high, i.e., when $Gain_{eye}=1$ holds, the acquired line-of-sight position coordinates ($x_{eye}$, $y_{eye}$) can be used.

Next, the value of an object gain $Gain_{Trg}$ obtained in the line-of-sight position correction value calculation varies depending on the type of the detected object, the object size, and the rating result obtained as object information. If it seems to be difficult to capture an image of the object in view of the object type and the object size, the object gain $Gain_{Trg}$ is changed to satisfy $Gain_{Trg}<1$. If it seems to be easy to capture an image of the object in view of the object type and the object size, the object gain $Gain_{Trg}$ is changed to satisfy $Gain_{Trg}=1$.

Lastly, the value of a scene determination gain $Gain_{sceane}$ used as scene determination information varies depending on the difficulty level of each scene. If it is determined that the difficulty level of the scene is high based on the camera operation information and object movement information acquired in step S35 as scene determination information, the scene determination gain $Gain_{sceane}$ is changed to satisfy $Gain_{sceane}<1$. If it is determined that the difficulty level of the scene is low based on the camera operation information and object movement information acquired in step S35, the scene determination gain $Gain_{sceane}$ is changed to satisfy $Gain_{sceane}=1$.

Based on these gains, the line-of-sight position correction value according to the present exemplary embodiment is obtained using a point-to-point distance ($\Delta X'$, $\Delta Y'$) as follows.

$$\Delta X'=x_{trg}-x_{eye}$$

$$\Delta Y'=y_{trg}-y_{eye} \qquad (2)$$

$$x_{cal}=\Delta X' \times Gain_{eye} \times Gain_{Trg} \times Gain_{Sceane}$$

$$y_{cal}=\Delta Y' \times Gain_{eye} \times Gain_{Trg} \times Gain_{sceane} \qquad (3)$$

The line-of-sight position correction value can be obtained by Expression (3).

Similarly, in the example illustrated in FIG. 15B, the line-of-sight reliability is high, i.e., $Gain_{eye}=1$, and the object is in a stationary state. Thus, the difficulty level is low, i.e., $Gain_{Trg}=1$, and the scene difficulty level is also low, i.e., $Gain_{sceane}=1$. It can be considered that the line-of-sight position correction value $CAL_{eye}$ is obtained by calculating the difference between the line-of-sight position coordinates ($x_{eye}$, $y_{eye}$) and the Trg coordinates ($x_{trg}$, $y_{trg}$).

FIG. 15C illustrates an example where an object (coffee) at the line-of-sight position coordinates ($x_{eye}$, $y_{eye}$) cannot be detected by the object detection unit according to the present exemplary embodiment. In this case, since the Trg coordinates ($x_{trg}$, $y_{trg}$) cannot be acquired, it is determined that the dynamic calibration operation will not be performed. Then, the processing proceeds to step S38 to correct the line-of-sight position using the line-of-sight position correction value $CAL_{eye}$ calculated as described above.

In step S38, the line-of-sight position is corrected using the line-of-sight position correction value $CAL_{eye}$ calculated in step S37. The line-of-sight position correction value CAL$_{eye}$ includes the horizontal position correction value and the vertical position correction value, so that the line-of-sight position coordinates are calculated by correcting the line-of-sight position correction value CAL$_{eye}$. After the calculation, the processing proceeds to step S4 in the main flowchart.

[Line-of-Sight Position Coarse Adjustment and Fine Adjustment]

Next, the line-of-sight position coarse adjustment and the line-of-sight position fine adjustment will be described with reference to FIGS. 7A to 7D. The processing described with reference to FIGS. 7A to 7D is implemented by the system control unit 50 running predetermined programs. FIGS. 7A to 7D illustrate processes for accurately designating an object frame and an AF frame by way of example for Target_A based on the user's line-of-sight position. The present exemplary embodiment illustrates an example where the user wishes to accurately display the AF frame for Target_A. In the present exemplary embodiment, highlighting a limited area to be described below enables the user to easily select a frame.

EyePosition illustrated in FIG. 7A represents the user's line-of-sight position. Target_A and Target_B illustrated in FIG. 7A represent persons (objects) standing side by side. TargetArea_A and TargetArea_B are object detection frames for Target_A and Target_B, respectively, that are displayed using the object information acquired by the system control unit 50 serving as the object detection unit. The present exemplary embodiment illustrates an example where persons standing side by side are set as objects. In addition to persons, other kinds of object such as animals, articles, and landscape can also be set.

Figure 7:
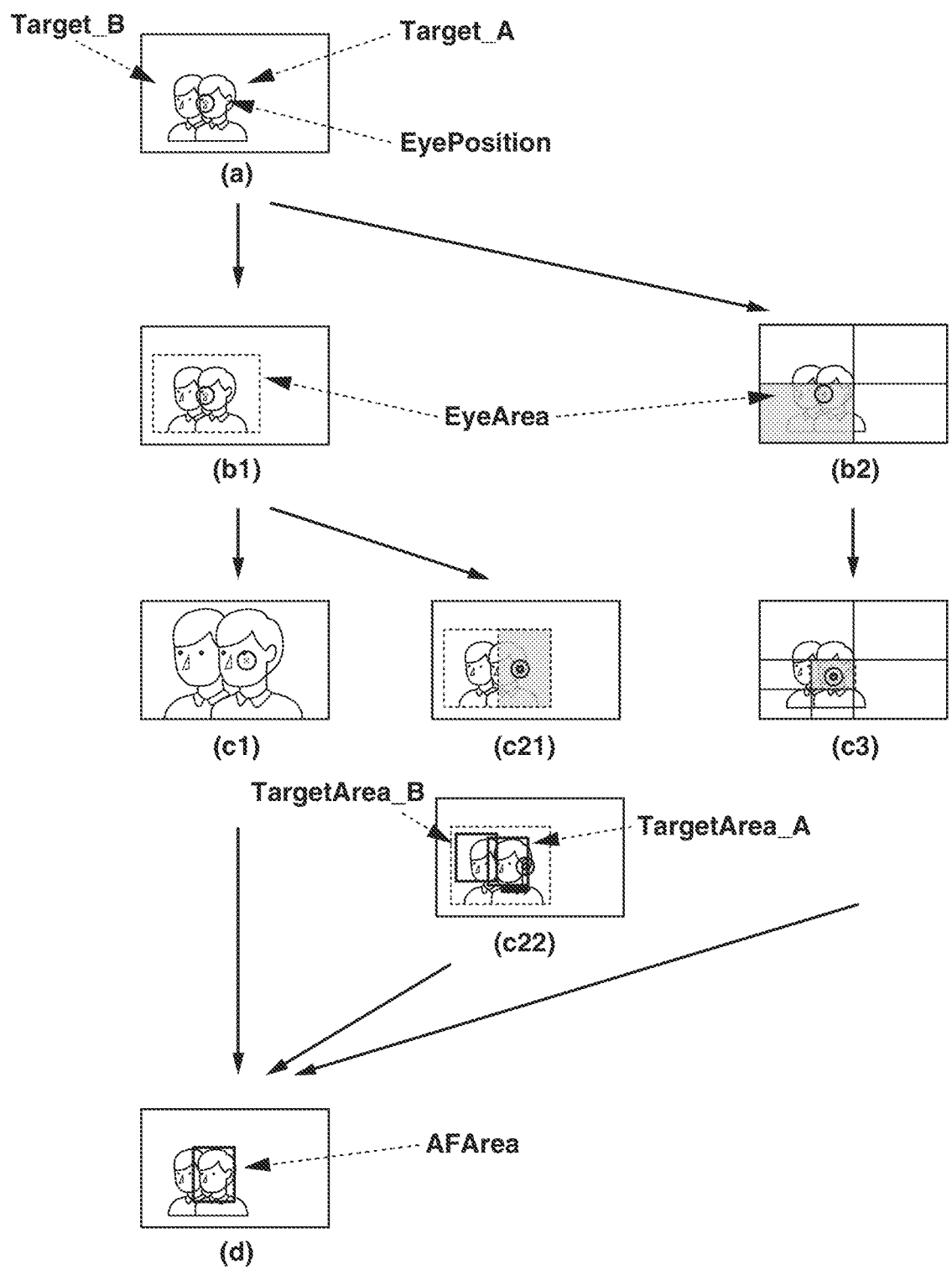
FIG. 7 illustrates a line-of-sight position coarse adjustment method and a line-of-sight position fine adjustment method.

FIGS. 7(*a*) to 7(*d*) illustrate a state where the scene is started from a state illustrated in FIG. 7(*a*) and the line-of-sight position coarse adjustment is performed in a state illustrated in FIGS. 7(*b*1) and 7(*b*2). In a state illustrated in FIGS. 7(*c*1) to 7(*c*3), the line-of-sight position fine adjustment is performed on the first limited area selected in the state illustrated in FIGS. 7(*b*1) and 7(*b*1). Finally, the AF frame is displayed for Target_A intended by the user as indicated by a state illustrated in FIG. 7(*d*).

First, the line-of-sight position coarse adjustment will be described with reference to FIGS. 7(*a*), 7(*b*1), and 7(*b*2). When the user displays the line-of-sight position at a location indicated by EyePosition in FIG. 7(*a*), the line-of-sight input operation unit 701 illustrated in FIG. 1 performs the line-of-sight position coarse adjustment determination. As a result, the system control unit 50 controls a first limited area EyeArea illustrated in FIGS. 7(*b*1) and 7(*b*2) to be displayed depending on the user's line-of-sight position coordinates and the reliability of the line-of-sight position.

The first limited area EyeArea is an area determined using the user's line-of-sight position coordinates, a partial area of a captured image. In this case, line-of-sight position coordinates acquired once may be used, or statistical data such as a moving average value at a plurality of points may be used. If the reliability of the user's line-of-sight position is low, a second limited area wider than the first limited area may be set. Even with a low reliability of the user's line-of-sight position, if the stop determination is performed in determination of the line-of-sight position coarse adjustment by the line-of-sight input operation unit 701, the first limited area may be continuously used instead of using the second limited area.

FIGS. 7(*b*1) and 7(*b*2) illustrate examples using different methods for displaying the first limited area EyeArea. FIG. 7(*b*1) illustrates an example where an area including Target_A and Target_B is set around EyePosition designated in FIG. 7(*a*). FIG. 7(*b*2) illustrates an example where an area (quadrant) including EyePosition obtained through a division of a scene into four areas is set.

Next, an example where the line-of-sight position fine adjustment is used from a state illustrated in FIG. 7(*b*1) will be described with reference to FIGS. 7(*c*1), 7(*c*21), and 7(*c*22). FIG. 7(*c*1) illustrates an example where the first limited area selected in FIG. 7(*b*1) is enlarged. The user's line-of-sight position is more accurately focused on Target_A in the enlarged display image, and then the line-of-sight input operation unit 701 determines the user's line-of-sight position by the line-of-sight position fine adjustment. As a result, the AF frame (AF area) is accurately displayed for Target_A as illustrated in FIG. 7(*d*).

FIG. 7(*c*21) illustrates designation of a vector position for detecting either of the right or left areas to which the user's line-of-sight position has moved from EyePosition as a start point in setting the first limited area EyeArea in FIG. 7(*b*1). FIG. 7(*c*21) illustrates an example where no object is detected in EyeArea illustrated in FIG. 7(*b*1). If no object is detected in EyeArea in FIG. 7(*b*1), like in FIG. 7(*c*21), EyeArea is narrowed through division of EyeArea into two areas in the horizontal direction. Then, object detection is performed again within the divided EyeArea including EyePosition, and AFArea is set for Target_A as illustrated in FIG. 7(*d*), consistent with the detected information about the detected Target_A. While the present exemplary embodiment illustrates an example where the line-of-sight position fine adjustment is carried out, the number of areas to be divided is not limited to two. Further, the area may be divided in the vertical direction, in addition to the horizontal direction.

Additionally, if the priority of the object is determined in object detection after the line-of-sight position coarse adjustment, AFArea may be set by prioritizing the detection of a desired object.

FIG. 7(*c*22) illustrates an example where an object within EyeArea is detected in FIG. 7(*b*1). In the example illustrated in FIG. 7(*c*22), objects located in the direction in which the user's line-of-sight position has moved from EyePosition in setting the first limited area EyeArea in FIG. 7(*b*1) can be selected with the object detection information in EyeArea. If an object within EyeArea is detected in FIG. 7(*b*1), like in FIG. 7(*c*22), TargetArea_A and Target_B are displayed using the object information acquired by object detection. FIG. 7(*c*22) illustrates a state where the user's line-of-sight position has moved to the right side of the screen and EyePosition is located on the right side of EyeArea. If the line-of-sight input operation unit 701 determines the line-of-sight position, EyePosition is located in TargetArea_A. Then, AFArea is set for Target_A as illustrated in FIG. 7(*d*), consistent with the detection information about the Target_A. While the present exemplary embodiment illustrates an example where EyePosition is located within the object detection frame, the determination method is not limited to this example. For example, determination areas may be provided on the inside and outside of the object detection frame. While the present exemplary embodiment illustrates an example where two persons are set as objects, objects other than two persons (such as animals and vehicles) may be detected.

Figure 2:
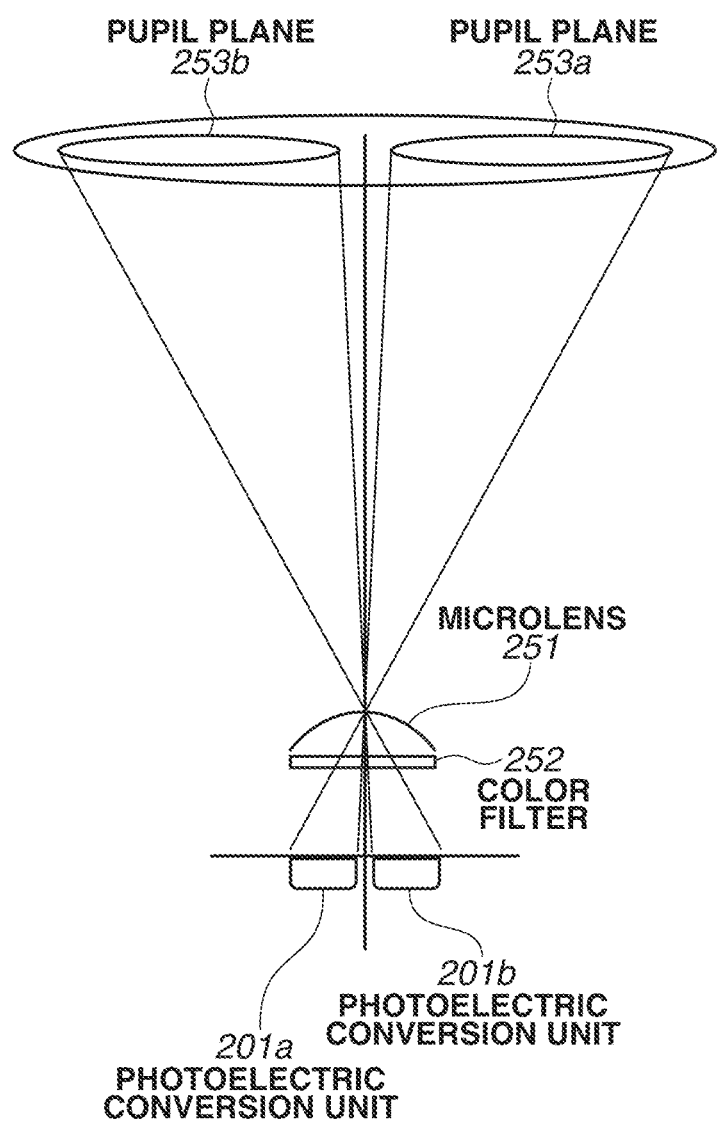
FIG. 2 illustrates a correspondence relationship between pupil planes and photoelectric conversion units in a pixel of the image capturing apparatus.

Lastly, a selection method illustrated in FIG. 7(*c*3) will be described. In FIG. 7(*c*3), the user's line-of-sight position is determined by the line-of-sight input operation unit 701 after the user's line-of-sight position has moved, EyeArea corresponding to the quadrant selected in FIG. 7B2 is further divided into four areas, and AFArea is set as illustrated in FIG. 7D. While the present exemplary embodiment illustrates a method for dividing an area into four areas, the method is not limited to this example as long as the areas can be distinguished from one another. For example, the area may be more finely divided into, for example, nine areas, or the area may be divided in the horizontal direction or in the vertical direction. While the present exemplary embodiment illustrates an example where AFArea is set as illustrated in FIG. 7(d) in one line-of-sight position fine adjustment process, the line-of-sight position fine adjustment process may be continuously performed until AFArea can be set.

As described above, by performing dynamic calibration correction processing on the line-of-sight position using line-of-sight information, object information, and scene determination information, an image capturing apparatus can constantly perform line-of-sight detection processing with high accuracy.

In addition, an electronic apparatus provides an improved display quality and user-friendliness by static or dynamic display of the line-of-sight position depending on variations in the line-of-sight position.

The line-of-sight position coarse adjustment and the line-of-sight position fine adjustment allows setting the user's line-of-sight position with more accuracy.

The present exemplary embodiment uses line-of-sight information, object information, and scene determination information. However, at least either line-of-sight information, object information, or scene determination information may be used for correction processing. Further, calibration data may be reset depending whether the observer' eye is in contact with the finder or is separated from the finder.

While the present exemplary embodiment illustrates a method for performing the static state determination and operation determination depending on variations in the line-of-sight position, the determination may be performed using a change angle range, vector information, and other information as line-of-sight position information. The determination may be performed using information such as gyroscope information on the electronic apparatus, as well as the line-of-sight position information.

While the present exemplary embodiment illustrates an example where the same value is used as the first threshold $Th_1$ for a horizontal position, a vertical position, and a point-to-point position, the first threshold $Th_1$ can be changed to another value, or different values can be used for a horizontal position, a vertical position, or a point-to-point position, respectively.

Figure 16A:
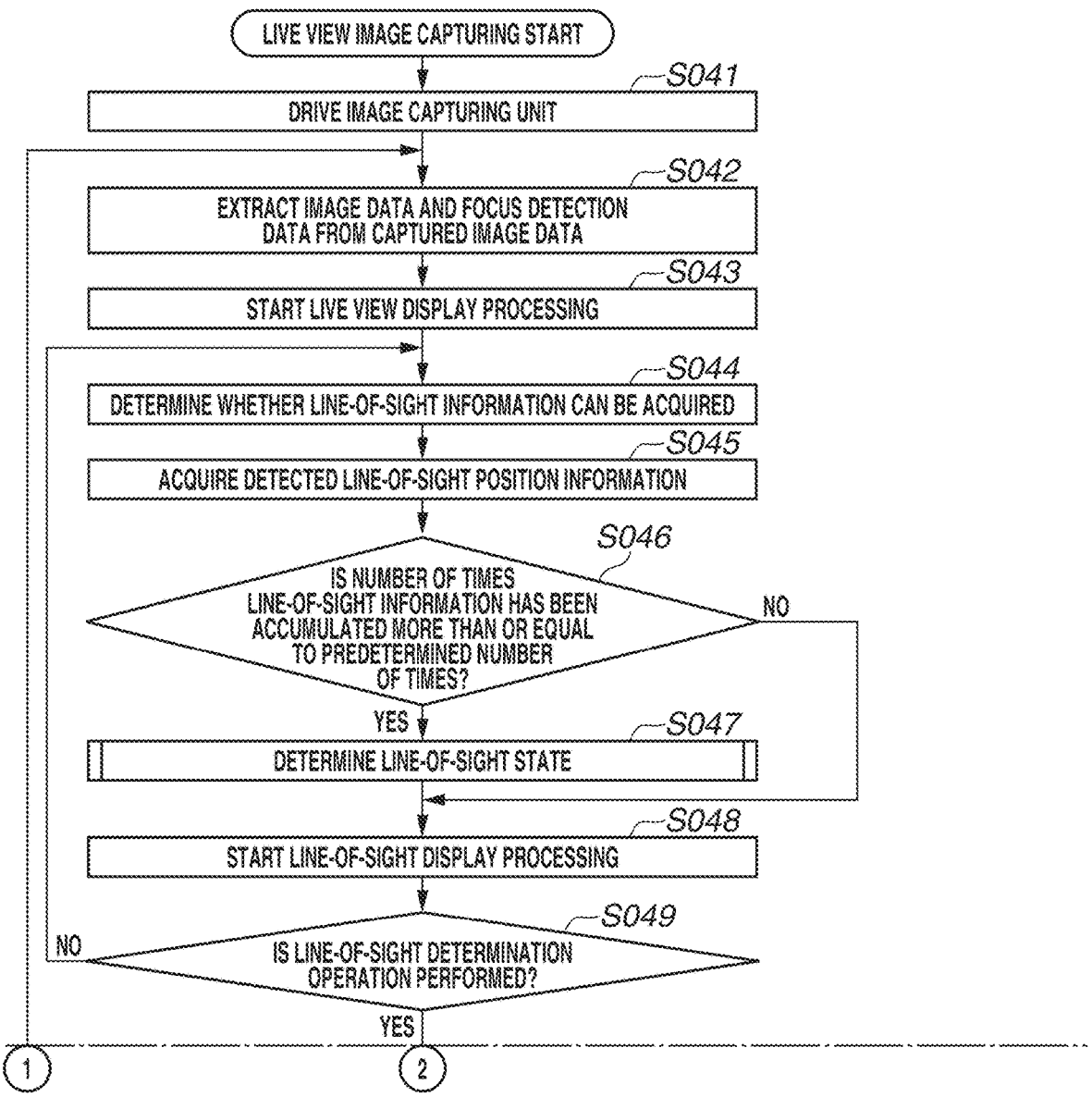
FIGS. 16A and 16B are a flowchart illustrating a focus detection operation, a line-of-sight detection operation, and an image capturing operation for an electronic apparatus according to one or more aspects of the present disclosure.
Figure 16B:
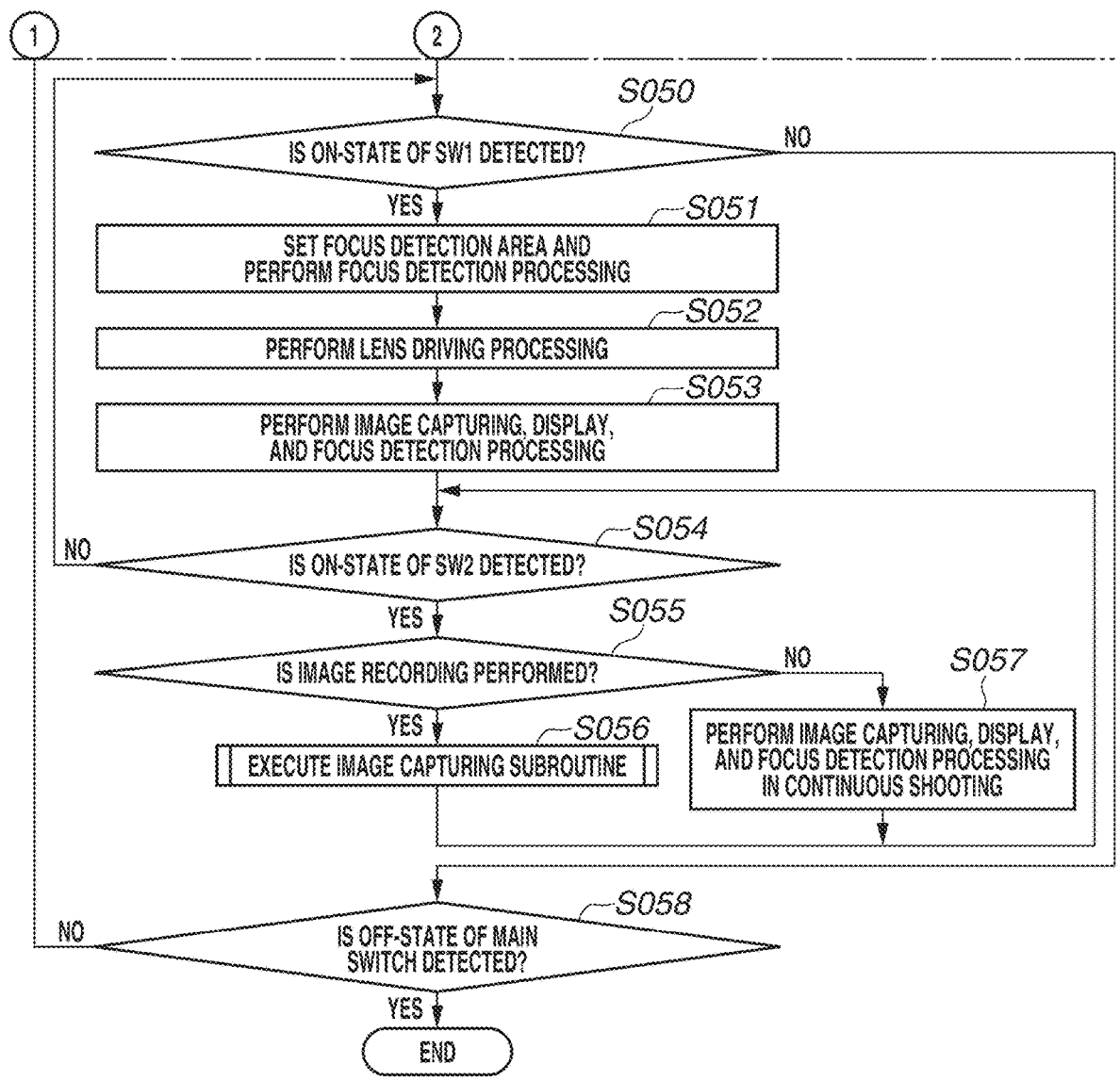

Next, a second exemplary embodiment will be described with reference to FIGS. 16A and 16B, and 17. The second exemplary embodiment illustrates a line-of-sight position display method used in combination with a focus detection apparatus.

[Description of Focus Detection Operation]

FIG. 2 illustrates a pixel configuration according to the present exemplary embodiment and a correspondence relationship between pupil planes and photoelectric conversion units. This configuration includes photoelectric conversion units 201, pupil planes 253, a microlens 251, and a color filter 252. The configuration illustrated in FIG. 2 is provided with two photoelectric conversion units 201: a photoelectric conversion unit 201a (first focus detection pixel) and a photoelectric conversion unit 201b (second focus detection pixel). Light that has passed through a pupil plane 253a enters the photoelectric conversion unit 201a. Light that has passed through a pupil plane 253b enters the photoelectric conversion unit 201b. This enables focus detection from signals obtained through the photoelectric conversion unit 201a and the photoelectric conversion unit 201b. Further, adding the signals obtained through the photoelectric conversion unit 201a and the photoelectric conversion unit 201b produces an image capturing signal.

In the present exemplary embodiment, pixels that have the configuration illustrated in FIG. 2 are provided over the entire screen area of the image capturing unit 22, thereby making it possible to focus any object displayed on the screen by phase difference detection.

Figure 3:
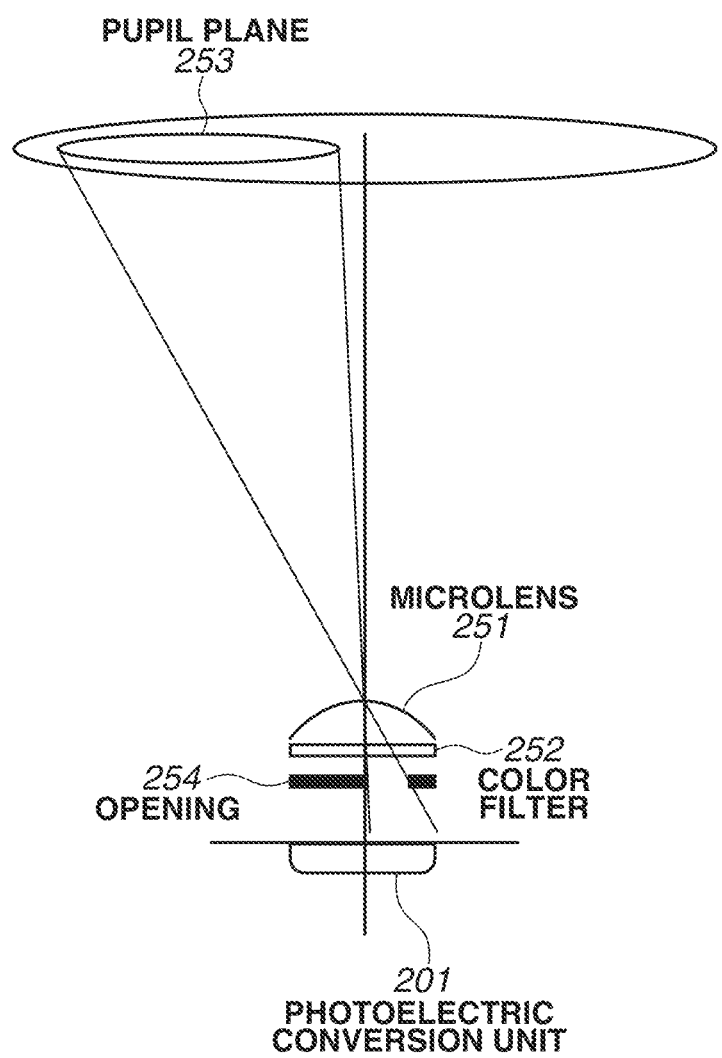
FIG. 3 illustrates a correspondence relationship between a pupil plane and an opening in a pixel of the image capturing apparatus.

While the present exemplary embodiment is described using the above-described focus detection method, the focus detection method is not limited to this example. For example, the image capturing unit 22 may be provided with pixels that are exclusively used for focus detection and have a configuration as illustrated in FIG. 3 to be described below to perform focus detection. Alternatively, the image capturing unit 22 may be provided with pixels dedicated to image capturing alone with no pixels for focus detection, which perform focus detection by a contrast method.

FIG. 3 illustrates a configuration example of a pixel exclusively used for focus detection and a correspondence relationship between a pupil plane and a photoelectric conversion unit. Unlike FIG. 2, FIG. 3 illustrates a pixel exclusively used for focus detection. The shape of the pupil plane 253 is determined depending on an opening 254. To acquire a focus detection signal, another pixel (not illustrated) in FIG. 3 for detecting light from the right pupil plane, which is paired with the pixel in FIG. 3, is used as the pixel of FIG. 3 detects the light that has passed through the pupil plane 253. The image capturing unit 22 is provided with focus detection pixels illustrated in FIG. 3 and image capturing pixels over the entire screen area, thereby enabling focusing on any object displayed on the screen by phase difference detection.

The digital camera 100 described above can capture images using a center one-point AF or face AF.

The center one-point AF refers to AF that is performed on one central position in the image capturing screen. The face AF refers to AF on the face in the image capturing screen detected by a face detection function.

The face detection function will now be described. The system control unit 50 sends face detection target image data to the image processing unit 24. Under the control of the system control unit 50, the image processing unit 24 uses a horizontal band-pass filter that acts on the image data. Under the control of the system control unit 50, the image processing unit 24 uses a vertical band-pass filter that acts on the processed image data. These horizontal and vertical band-pass filters detect edge components in the image data.

After that, the system control unit 50 performs pattern matching on the detected edge components and extracts a group of candidates for eyes, nose, mouse, and ears. Then, the system control unit 50 selects, from the extracted eye candidate group, eyes that satisfy preset conditions (e.g., a distance or inclination between two eyes) to recognize the selected eyes as a pair of eyes, and narrows the candidate group including pairs of eyes. Further, the system control unit 50 associates the narrowed candidate group with other parts (e.g., nose, mouse, and ears) that form the corresponding face, and further performs filtering processing using a preset non-face condition filter to thereby detect the face. The system control unit 50 outputs the above-described face information depending on the face detection result, and then terminates the processing. In this case, feature values such as the number of faces are stored in the system memory 52. The method for carrying out the face detection function is not limited to the above-described method. Similarly, the number of faces, the size of each face, parts of each face, and other features may be detected by a method using known machine learning. The type of each object is not limited to the face of each person. For example, animals, and vehicles may be detected.

The image analysis of image data used for live view display or playback display enables extraction of feature values from the image data to detect object information. While the present exemplary embodiment illustrates an example where face information is used as object information, various types of information such as information about red-eye determination, eye detection, eye closure detection, and smile face detection can be used as the object information.

Along with the face AF, face AE, face FE, and face WB can be performed simultaneously. The face AE refers to optimization of exposure for the entire screen depending on the brightness of the detected face. The face FE refers to a flash dimming operation to be performed mainly on the detected face. The face WB refers to optimization of WB for the entire screen depending on the color of the detected face.

[Descriptions of Line-of-Sight Detection Processing Method, Line-of-Sight Position State Determination, and Determination Results]

Next, a line-of-sight detection processing method for, line-of-sight position state determination by, and determination results for an electronic apparatus according to the second exemplary embodiment will be described with reference to FIGS. 16A and 16B. FIGS. 16A and 16B are a flowchart illustrating a focus detection operation, a line-of-sight detection operation, and an image capturing operation by the electronic apparatus according to the present exemplary embodiment. FIGS. 16A and 16B illustrate an operation to be performed in live view image capturing to perform image capturing in a live view state (moving image capturing state) such as an image capturing standby state, and the processing in the flowchart illustrated in FIGS. 16A and 16B is mainly implemented by the system control unit 50.

In step S041, the system control unit 50 controls the image capturing unit 22 to drive and acquire image capturing data. The image capturing data to be acquired is not data for recording to be described below, but is image data for detection and display, so that the image size is smaller than that of a recording image. In step S041, image data with a sufficient resolution to perform focus detection, object detection, or live view display is obtained. In this case, since the driving operation for moving image capturing for live view display is carried out, image capturing is performed using a so-called electronic shutter, which accumulates and reads out electric charges for a period of time depending on a frame rate for live view display. In this case, the live view display is performed so that the user can check the image capturing range and image capturing conditions. For example, 30 frames/s (image capturing interval of 33.3 mS) or 60 frames/s (image capturing interval of 16.6 mS) may be set.

In step S042, the system control unit 50 acquires focus detection data obtained through the first focus detection pixel and the second focus detection pixel included in the focus detection area from the image capturing data obtained in step S041. Further, the system control unit 50 adds outputs signals from the first focus detection pixel and the second focus detection pixel to produce an image capturing signal, and acquires image data obtained through color interpolation processing at the image processing unit 24. Thus, image data and focus detection data can be obtained by one image capturing operation. If the image capturing pixel, the first focus detection pixel, and the second focus detection pixel are separate from one another, image data is acquired through interpolation processing or other processing on the focus detection pixels.

In step S043, the system control unit 50 generates an image for live view display using the image processing unit 24 based on the image data obtained in step S042, and displays the generated image on the display unit 28. The image for live view display is, for example, an image in a size reduced depending on the resolution of the display unit 28. In generating image data in step S042, the image processing unit 24 can also perform reduction processing. In this case, the system control unit 50 causes the display unit 28 to display the image data acquired in step S042. As described above, the image capturing and display processing are performed at the predetermined frame rate in live view display, which enables the user to perform adjustment of the composition, exposure conditions, and other conditions during image capturing through the display unit 28.

As described above, in the present exemplary embodiment, the face of a person, an animal, and other type of objects can be detected as an object. In step S043, a frame indicating the area of the detected object and other items is also displayed at the start of the live view display. Like in step S1 of the main flowchart according to the first exemplary embodiment, the acquired image may be displayed instead of the live view image.

The subsequent steps S044 to S049 are respectively identical to steps S12 to S17 according to the first exemplary embodiment, and the redundant descriptions thereof will be omitted.

If the on-state of SW1 is not detected (or off-state is detected) in step S050 (NO in step S050), the processing proceeds to step S058. In step S058, the system control unit 50 determines whether the main switch included in the operation unit 70 is turned off. On the other hand, if the on-state of SW1 is detected in step S050 (YES in step S050), the processing proceeds to step S051. In step S051, the system control unit 50 sets the focus detection area to be focused and performs focus detection processing. In this case, the focus detection area is set using the line-of-sight position where the detection processing is started in step S048. The line-of-sight position detected in step S048 includes an error caused by various factors with respect to the object position intended by the user.

In step S051, the focus detection area is set using the line-of-sight position information subjected to the processing to be described below. In this case, the line-of-sight position may be aligned with the center position of the focus detection area. If there are candidates for the focus detection area to be detected by another unit such as the object detection unit, the object area detected at the line-of-sight position may be associated with the candidates for the closest object area to be selected as the focus detection area. In step S051 and subsequent steps, the setting of the focus detection area using line-of-sight position information and focus detection processing are repeatedly performed every time an image capturing operation is performed. The focus detection processing will now be described.

The amount of defocus and direction are determined for each focus detection area using the focus detection data corresponding to the set focus detection area. In the present exemplary embodiment, on the assumption that the system control unit 50 generates an image signal for focus detection, calculates the amount of deviation (phase difference) of the focus detection signal, and performs processing for determining the amount of defocus and direction based on the amount of deviation calculated.

A shading correction and filtering processing are performed on a first focus detection signal and a second focus detection signal, which are obtained as image signals for focus detection from the set focus detection area, to reduce the difference between the quantities of light of a pair of signals and extract a signal with a spatial frequency for phase difference detection. Next, shift processing is performed that shifts the first focus detection signal and the second focus detection signal obtained after the filtering processing relatively in the pupil division direction, and the amount of correction representing the match between the signals is calculated.

Let A(k) denote a k-th first focus detection signal obtained after filtering processing, B(k) denote the second focus detection signal, and W denote the range of the number k corresponding to the focus detection area, and let $S_1$ denote the amount of shift of shift processing and $\Gamma 1$ denote the shift range of the shift amount $S_1$, the amount of correlation COR is calculated by Expression (6).

$$COR(s_1) = \Sigma_{k \in W} |A(k) - B(k - s_1)| s_1 \in \Gamma 1 \qquad (6)$$

In shift processing using the amount of shift $S_1$, the k-th first focus detection signal A(k) and a (k–$S_1$)th second focus detection signal B(k–$S_1$) are associated with each other, and subtraction calculation is made to generate a shift subtraction signal. The absolute value of the generated shift subtraction signal is calculated, and the sum of numbers "k" is calculated within the range W corresponding to the focus detection area, thereby calculating the amount of correlation COR (S1). The amounts of correlation COR in a plurality of rows that are calculated for the individual rows may be added up for each amount of shift, as appropriate.

Next, the real value of the amount of shift at which the amount of correlation COR has a minimum value is calculated as the amount of image deviation p1 by subpixel calculation based on the amount of correlation COR. The amount of image deviation p1 calculated is multiplied by the image height of the focus detection area, the F-value of an image capturing lens (imaging optical system), and a conversion factor K1 corresponding to an exit pupil distance, thereby determining the amount of defocus detected.

In step S052, the system control unit 50 performs lens driving based on the amount of defocus detected in the selected focus detection area. If the amount of defocus detected is smaller than a predetermined value, lens driving is not performed.

In step S053, the acquisition of the image for detection and display in step S041, the live view display in step S043, and the focus detection processing in step S046 are carried out. In the live view display, as described above, information about the detected object area and the line-of-sight position is also displayed in a superimposed manner. The processing in step S053 may be performed in parallel in lens driving in step S052. The focus detection area may be changed in association with the determined line-of-sight position depending on the live view display to be updated, as needed.

After the completion of the focus detection processing, the processing proceeds to step S054. In step S054, the system control unit 50 detects on/off of the second shutter switch 64 (SW2) indicating an image capturing start instruction. A release (image capturing trigger) switch that is one example of the operation unit 70 can detect two states of the on-state and the off-state depending on the amount of push-in, and the on/off of the above-described SW2 correspond to the two states of the on-state and the off-state of the release (image capturing trigger) switch. If the on-state of SW2 is not detected in step S054 (NO in step S054), the processing returns to step S050 so that the system control unit 50 detects the on/off state of the SW1.

Further, the object detection according to the present exemplary embodiment is performed on the image for detection acquired in step S041, thereby acquiring the detected object position and range information. In the present exemplary embodiment, the line-of-sight position information is changed using the obtained detected object information and the line-of-sight position information obtained in step S048. The acquired detected object information is compared with the line-of-sight position information. If it is determined that the line-of-sight position falls within the detected object range the first determination number of times $JN_1$, the above-described static state determination is carried out to statically display the line-of-sight information on the display unit 28. Instead of setting the detected object range, for example, a range in the vicinity of the detected object range may be set as the determination range. Instead of statically displaying the line-of-sight information, the line-of-sight information display may be hidden.

In the present exemplary embodiment, the predetermined number of times N, the first determination number of times $JN_1$, and the second determination number of times $JN_2$ can be changed depending on the set AF mode. Examples of the AF mode include one-shot AF in which the above-described AF control is performed once upon detection of SW1 in step S020, and servo AF in which the AF control is continuously performed while SW1 is continuously detected. It is considered that a one-shot AF mode is often used when the composition is determined and the image of a stationary object is first captured at a low speed. For this reason, the first determination number of times and the second determination number of times according to the present exemplary embodiment when one-shot AF is used are set more often than when the servo AF is used, and greater values are set as the first threshold and the second threshold when one-shot AF is used. This enables the line-of-sight position fine adjustment on the object and also enables favorable line-of-sight display.

On the other hand, a servo AF mode is often used when the image of an object moving at a middle speed or at a high speed that involves a framing operation is captured. For this reason, the first determination number of times and the second determination number of times according to the present exemplary embodiment when the servo AF is used are set less often than those when the one-shot AF is used, and smaller values are set as the first threshold and the second threshold when servo AF is used. Consequently, a prompt operation display can be performed, which enables a favorable line-of-sight display of an object that is moving at a high speed.

Instead of changing the setting depending on the AF mode as described above, the user can freely set the first determination number of times and the second determination number of times according to the present exemplary embodiment and the first threshold and the second threshold according to the present exemplary embodiment.

If the on-state of SW2 is detected in step S054 (YES in step S054), the processing proceeds to step S055. In step S055, the system control unit 50 determines whether to perform image recording. In the present exemplary embodiment, the image acquisition processing in continuous shooting is switched among pieces of processing for image recording, for image capturing/display, and for focus detection. The processing may be alternately switched. For example, image capturing/display processing and focus detection processing may be performed once every three times. This enables focus detection with high accuracy without significantly reducing the number of captured images per unit time.

If it is determined that image recording is performed in step S055 (YES in step S055), the processing proceeds to step S056. In step S056, an image capturing subroutine is performed. The image capturing subroutine will be described in detail below. After the image capturing subroutine is performed in step S056, the processing returns to step S054 to detect whether the on-state of SW2 is detected, or whether a continuous shooting instruction is issued.

If it is determined that the image capturing/display processing and focus detection processing are performed in step S055 (NO in step S055), the processing proceeds to step S057. In step S057, image capturing/display processing and focus detection processing in continuous shooting are performed. The image capturing/display processing and focus detection processing in continuous shooting are similar to those in step S053. The processing in step S057 differs from the processing in step S53 in regard to an image capturing rate in continuous shooting, a display period for the image captured in step S057, a display update rate (interval), and a display delay depending on recording image generation processing or other processing. The system control unit 50 serving as the display unit performs these display control operations. The obtained line-of-sight position information is used for setting of the focus detection area and association with the detected object area as described above, for example. These operations will be described in detail below. After the image capturing/display processing and focus detection processing in continuous shooting are performed in step S056, the processing returns to step S054 to determine whether the on-state of SW2 is detected, or whether a continuous shooting instruction is issued. If the on-state of SW1 is not detected (or off-state is detected) in step S050 and the off-state of the main switch is detected in step S058 (YES in step S058), the focus detection and image capturing operation are terminated. On the other hand, if the off-state of the main switch is not detected in step S58 (NO in step S058), the processing returns to step S042 to acquire image data and focus detection data.

[Description of Image Capturing Subroutine]

Next, the image capturing subroutine to be performed in step S026 illustrated in FIGS. 16A and 16B will be described with reference to a flowchart illustrated in FIG. 17. A series of operations in this subroutine are also mainly implemented by the system control unit 50.

In step S0161, the system control unit 50 performs exposure control processing to determine image capturing conditions (shutter speed, aperture value, and image capturing sensitivity). The system control unit 50 can perform the exposure control processing based on luminance information about image data. However, any known technique can also be used. In the present exemplary embodiment, a timing for obtaining image data for use in exposure control processing and other processing will be described in detail below. In step S0161, the operation of the shutter 101 is controlled based on the determined aperture value and shutter speed. The system control unit 50 causes electric charge to be accumulated during a period in which the image capturing unit 22 is exposed to light through the shutter 101.

After the end of the exposure period, in step S0162, the system control unit 50 performs image reading for fine still image capturing, or an operation for reading out all pixels. Additionally, the system control unit 50 performs image reading from the first focus detection pixel or the second focus detection pixel. Signals read from the focus detection pixels are used to detect the in-focus state of the object during image playback. For this reason, the amount of data to be read out can be reduced by limiting the area or setting a low resolution for all the pixels in the recording image for fine still image capturing. With a signal from the first focus detection pixel or the second focus detection pixel, the difference between the signal and the image signal for fine still image capturing can be calculated to thereby calculate the other focus detection signal. In the present exemplary embodiment, with a higher priority put on a signal-to-noise (S/N) ratio of the image signal for fine still image capturing, the image signal for fine still image capturing and one of focus detection signals are read out and recorded, and the other focus detection signal is calculated by arithmetic operation. The subsequent image processing is performed on the image signal for fine still image capturing and one of focus detection signals.

In step S0163, the system control unit 50 causes the image processing unit 24 to perform defective pixel correction processing on the read image data. In step S0164, the system control unit 50 performs image processing such as demosaicing (color interpolation) processing, WB processing, γ-correction (gradation correction) processing, color conversion processing, and edge emphasis processing, encoding processing, and other types of processing on image data obtained after defective pixel correction processing by the image processing unit 24. In step S0165, the system control unit 50 records the image signal for fine still image capturing and one of focus detection signals on the memory 32 as an image data file.

In step S0166, the system control unit 50 records camera body characteristic information in association with the captured image recorded in step S0165 on the memory 32 and a memory in the system control unit 50. Examples of the camera body characteristic information include the following information.

image capturing conditions (such as aperture value, shutter speed, and image capturing sensitivity), information about image processing used at the mage processing unit 24, light-reception sensitivity distribution information about pixels for image capturing and pixels for focus detection of the image capturing unit 22, information about vignetting of image capturing beams in the camera body, information about the distance from the mounting surface between the camera body and the lens unit 150 to the image capturing unit 22, and manufacturing error information The light-reception sensitivity distribution information about pixels for image capturing and pixels for focus detection of the image capturing unit 22 depends on the on-chip microlens 251 and the photoelectric conversion unit 201, and information about these members may be recorded. The light-reception sensitivity distribution information is information about the sensitivity depending on the position at a predetermined distance on the optical axis from the imaging device. A variation in the sensitivity with respect to a light incident angle may be used as the light-reception sensitivity distribution information.

In step S0167, the system control unit 50 associates the information with the captured image recorded in step S0165, and records the lens unit characteristic information on the memory 32 and a memory in the system control unit 50. Examples of the lens unit characteristic information include exit pupil information, frame information, information about a focal length, F-number information, and aberration information in image capturing, manufacturing error information, and object distance information associated with the focus lens position during image capturing. In step S0168, the system control unit 50 records image-related information about the captured image on the memory 32 and a memory in the system control unit 50. The image-related information may include information about a focus detection operation to be performed before image capturing, object movement information, and accuracy of the focus detection operation.

In step S0169, the system control unit 50 displays a preview of the captured image on the display unit 28. This enables the user to simply check the captured image. The image for preview display in step S0169 is used to facilitate checking of the image. For this reason, the processing operations in steps S0163 and S0164 can be omitted. If the processing operations are skipped, the preview display in step S0169 may be performed in parallel with the processing of step S0163 and subsequent steps, thereby further reducing time lag from the exposure to the display.

After the completion of the processing in step S0169, the system control unit 50 terminates the image capturing subroutine of step S026, and then the processing proceeds to step S024 in the main routine. In the present exemplary embodiment, the acquired image is displayed in continuous shooting when image recording is performed in the image capturing subroutine of step S026, and also when the image capturing/display processing and focus detection processing during continuous shooting are performed in step S027.

As described above, an electronic apparatus provides an improved display quality and user-friendliness by static or dynamical display of the line-of-sight position depending on variations in the line-of-sight position.

Other Exemplary Embodiments

The first exemplary embodiment described above illustrates an example where the line-of-sight position coarse adjustment is first performed and then the line-of-sight position fine adjustment is performed. However, the line-of-sight position coarse adjustment or the line-of-sight position fine adjustment may be performed.

The above-described exemplary embodiments illustrate a method for performing the static state determination and operation determination depending on the AF mode or object detection. The processing to be performed according to the above-described exemplary embodiments may be changed depending on the image capturing mode, such as the moving image capturing mode or the still image capturing mode, or the difference in image capturing apparatus operation method such as image capturing using a finder or image capturing using a back liquid crystal screen.

The order of steps to be performed, as appropriate, in the operations described above with reference to the flowcharts according to the above-described exemplary embodiments can be changed to achieve similar objectives.

The processing according to the exemplary embodiments of the present disclosure can also be implemented by processing in which a program for implementing one or more functions according to the above-described exemplary embodiments is fed to a system or an apparatus via a network or a storage medium, and one or more processors in a computer of the system or the apparatus read out and run the program. The processing according to the exemplary embodiments of the present disclosure can also be implemented by a circuit (e.g., an application specific integrated circuit (ASIC)) for implementing one or more functions according to the above-described exemplary embodiments.

The exemplary embodiments described above illustrate an example where a digital camera is used as an apparatus for image capturing. In addition, the processing according to the exemplary embodiments of the present disclosure may also be implemented in any other apparatus such as a smartphone, a personal computer (PC), a tablet computer, and a head mounted display.

According to an aspect of the present disclosure, an object can be selected more user-friendly based on a line-of-sight position.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-144927, filed Sep. 6, 2021, which is hereby incorporated by reference herein in its entirety.

What is claimed is:

1. An electronic apparatus comprising at least one processor configured to perform the operations of the following units:
   a display unit configured to display a captured image;
   an acquisition unit configured to acquire line-of-sight information including a line-of-sight position of an observer that observes the display unit;
   a display control unit configured to control display based on the line-of-sight information; and
   a selection unit configured to select an object based on the line-of-sight information; and
   a setting unit configured to set a sensitivity for the line-of-sight position,
   wherein the display unit highlights a limited area as a part of the captured image based on the line-of-sight information, wherein the selection unit selects an object based on the observer's line-of-sight information about the display, and wherein the limited area is changed based on the sensitivity and the sensitivity for the line-of-sight position in a case where a smoothing score for line-of-sight position information indicates a first number is higher than the sensitivity for the line-of-sight position in a case where the smoothing score for the line-of-sight position information indicates a second number greater than the first number.

2. The electronic apparatus according to claim 1, wherein the display unit highlights an area including the line-of-sight position of the observer as the limited area.

3. The electronic apparatus according to claim 1, wherein the display unit highlights the limited area by enlarging the limited area.

4. The electronic apparatus according to claim 1, wherein the display unit highlights the limited area by displaying the limited area in such a manner that the limited area is distinguished from other areas.

5. The electronic apparatus according to claim 4, wherein in the display of the limited area in such a manner that the limited area is distinguished from other areas, the display unit displays the limited area by dividing the limited area into a plurality of areas.

6. The electronic apparatus according to claim 4, wherein in the display of the limited area in such a manner that the limited area is distinguished from other areas, the display unit displays the limited area by dividing the captured image into a plurality of areas including the limited area.

7. The electronic apparatus according to claim 1, further comprising a detection unit configured to detect an object in the captured image, wherein the display unit highlights an area where the object is detected by the detection unit as the limited area.

8. The electronic apparatus according to claim 7, wherein the display unit controls the display depending on a priority of the detected object.

9. The electronic apparatus according to claim 1, wherein the line-of-sight information includes a reliability of the line-of-sight position of the observer acquired by the acquisition unit, and wherein an area to be displayed as the limited area by the display unit in a case where the reliability is low is wider than an area to be displayed as the limited area by the display unit in a case where the reliability is high.

10. A control method for an electronic apparatus including a display unit configured to display a captured image, the control method comprising:

acquiring line-of-sight information including a line-of-sight position of an observer that observes the display unit;

controlling display based on the line-of-sight information;

selecting an object based on the line-of-sight information; and setting a sensitivity for the line-of-sight position, wherein in the display control, a limited area as a part of the captured image is highlighted based on the line-of-sight information, wherein in the selection, an object is selected based on the observer's line-of-sight information about the display, and wherein the limited area is changed based on the sensitivity and the sensitivity for the line-of-sight position in a case where a smoothing score for line-of-sight position information indicates a first number is higher than the sensitivity for the line-of-sight position in a case where the smoothing score for the line-of-sight position information indicates a second number greater than the first number.

* * * * *